United States Patent [19]
Grinde et al.

[11] Patent Number: 5,845,918
[45] Date of Patent: Dec. 8, 1998

[54] ALL TERRAIN VEHICLE WITH SEMI-INDEPENDENT REAR SUSPENSION

[76] Inventors: James E. Grinde, 1202 E. Greenwood St.; Troy Leiphart, 105 Kenwood Ct., both of Thief River Falls, Minn. 56701; Ronald Solberg, 14655 Palm St., Andover, Minn. 55304

[21] Appl. No.: 739,449

[22] Filed: Oct. 29, 1996

[51] Int. Cl.[6] .................................................. B60G 1/00
[52] U.S. Cl. ............................. 280/124.1; 280/124.103
[58] Field of Search ..................................... 280/680, 788, 280/124.1, 124.103; 180/215

[56] References Cited

U.S. PATENT DOCUMENTS

| | | | |
|---|---|---|---|
| 4,735,275 | 4/1988 | Tsukahara et al. | 180/215 |
| 4,836,324 | 6/1989 | Morita et al. | 180/215 |
| 4,877,102 | 10/1989 | Stewart | 180/217 |
| 5,060,748 | 10/1991 | Iwai et al. | 180/215 |
| 5,107,952 | 4/1992 | Matsubayashi et al. | 180/215 |
| 5,467,839 | 11/1995 | Yoshio | 180/233 |

OTHER PUBLICATIONS

Nov. 30, 1995 Arctic Cat Sales Bulletin ATV96–01.
May 1989 SAE Tech.Paper 891105, Steady State and Dynamic Properties of All Terrain Vehicles Related to Lateral Directional Handling and Stability.
May 1989 SAE Tech.Paper 891108, All Terrain Vehicle Lateral Stability and the Limits of Control.
May 1989 SAE Tech.Paper 891109, Transient Analysis of All Terrain Vehicle Lateral Directional Handling & Stability.
Feb. 1996 Dirt Wheels Magazine, pp. 24–30.
Dec. 1995/Jan. 1996 Minnesota Off Road magazine, p. 16.

*Primary Examiner*—Kenneth R. Rice

[57] ABSTRACT

An all terrain vehicle having its chassis, its front suspension, its rear axle, its rear suspension, and its power transmission shaft interconnected in a manner that allows the rear axle to rotate about both the longitudinal and a transverse axis of the all-terrain vehicle to provide increased flexibility in its rear end so that the vehicle's rear tires remain on the ground at least as long as its front tires remain on the ground when traversing relatively even terrain so that the vehicle will not transition from understeer to oversteer.

12 Claims, 12 Drawing Sheets

ALL TERRAIN VEHICLE WITH SEMI-INDEPENDENT REAR SUSPENSION

BACKGROUND

This invention relates to the design of the front and rear suspensions of an all-terrain-like vehicle, to provide greater operator control of the vehicle. The present invention relates to a four-wheel all terrain vehicle (ATV) having a semi-independent rear suspension. This new rear suspension allows the rear axle to rotate about both a longitudinal axis and a transverse axis of the ATV, creating a vehicle which provides continuous and consistent understeer under normal operating conditions, minimizes operational transitions from understeer to oversteer under adverse conditions, and provides more uniform handling characteristics and increased operator comfort.

ATVs are generally known in the art as being large-tired vehicles suitable for off-road operation on uneven terrain. They have one or two front wheels and two rear wheels mounted on a solid rear axle. Those with one front wheel, i.e., three-wheeled ATVs, have not been marketed in the United States since 1987. Conventional ATVs generally have large balloon tires containing low air pressure in order to obtain adequate traction on a variety of terrains. Current vehicles of this type generally have a rear axle assembly and swing arm to pivot as a unit about a transverse axis of the vehicle. In addition, the rear link arms of conventional ATVs are positioned in a significantly upward direction and thereby impart a lifting or jacking effect to the ATV chassis when the ATV is accelerated and a lowering effect to the chassis when the ATV is decelerated. This jacking and lowering effect alters the height of the center of gravity in conventional ATVs.

The stiffness of the rear suspension of conventional ATVs is such that one or the other rear tire can leave the ground surface as the vehicle traverses uneven terrain or a curve, creating partial loss of traction and unbalanced drive forces. The solid rear axle of conventional ATVs, combined with their rigid swing arms, present unique handling characteristics.

ATV turning motions are resisted by the solid rear axle. When turning any wheeled vehicle, the inside rear wheel must follow a shorter path than the outside wheel. However, because of the solid rear axle, both wheels are constrained to rotate at the same speed, so that a moment or torque is generated that opposes the vehicle's turning motion. This phenomenon is called understeer. Overcoming this turn-induced moment requires an extra side force at the vehicle's front axle, which is applied by the operator's increasing the angle of steer to accomplish the turn. As the turn progresses, centrifugal force operates to transfer weight from the inside tires. When the inside rear tire loses ground contact it no longer opposes the turn and the vehicle transitions into oversteer. A sudden transition from understeer to oversteer in a conventional ATV can cause dramatic changes in handling characteristics that may be difficult for operators to respond to, especially inexperienced operators. As the vehicle turns more sharply, centrifugal force increases and the center of gravity of the vehicle moves laterally to a position closer to the outside wheels.

The weight shift induced by turns increases the side loading on the outside tires. If the tires are flexible, as in conventional ATVs, the side loading on the outside tire will distort the bottom portion of the tire so that the tire contact patch is moved inward in relation to the body of the ATV and the combined center of gravity of the rider and vehicle is shifted closer to the outside contact patch. This effectively reduces the track width of the rear wheels.

Conventional ATVs have a rigid swing arm type suspension, which allows the rear axle assembly and swing arm to pivot in only one direction, i.e., a pitch motion about a transverse axis of the ATV. Improved vehicle dynamics could be obtained if the rear axle could rotate about the vehicle's longitudinal centerline as well, so that both rear wheels could remain on the ground during normal operation.

At times, conventional ATVs require reactions on the part of the operator which are not only physically difficult but are also counter-intuitive. They require shifting one's weight to the outside foot rest while turning in the opposite direction to permit the inner rear wheel to lift from the ground and slip, thereby maintaining responsiveness to operator input. As the operator shifts his weight to the outside of the vehicle he must also lean his upper body toward the inside of the curve to overcome the turn-induced centrifugal force.

For the foregoing reasons, there is need for an ATV having a semi-independent rear suspension which will require fewer structural components, which will be more stable during operation over rough terrain and through turns, which will not suddenly shift from understeer to oversteer, which will provide added comfort for the operator, and which will provide an improved operator reaction envelope, i.e., time to respond to outside terrain influence.

SUMMARY

This invention is directed to an ATV which satisfies the need referred to above. This invention comprises an ATV having a semi-independent rear suspension which allows the rear axle to rotate both in pitch mode about a transverse axis of the ATV and in roll mode about a longitudinal axis of the ATV, thus giving improved operation and handling characteristics by keeping both rear tires on the ground during normal operation, giving improved traction on uneven terrain, providing for vehicle stability during cornering, preventing the sudden transition from understeer to oversteer, and giving increased operator comfort and control.

This invention is for an ATV having a chassis, an engine, two or more front wheels and tires, and a front suspension connecting the front wheels and tires to the chassis. The rear end has two or more rear wheels and tires and a rear axle connecting the rear wheels to each other. The ATV has a semi-independent rear suspension connecting the rear axle to the chassis in such a way that the rear suspension has more angularity of roll than the front suspension. When traveling over relatively even terrain, roll moment loading causes a front tire of the ATV to lose contact with the terrain before any rear tire of the ATV loses contact with the terrain. Thus the ATV maintains understeer in normal operation.

This invention overcomes the shortcomings of conventional ATVs and provides an improvement over the prior art.

BRIEF DESCRIPTION OF THE DRAWINGS

These and other features, aspects, and advantages of the present invention will become better understood with regard to the following description, appended claims, and accompanying drawings, where:

FIG. 9 depicts the longitudinal centerline of the power transmission shaft and the transverse axis of the ATV.

DESCRIPTION

Figure 1:
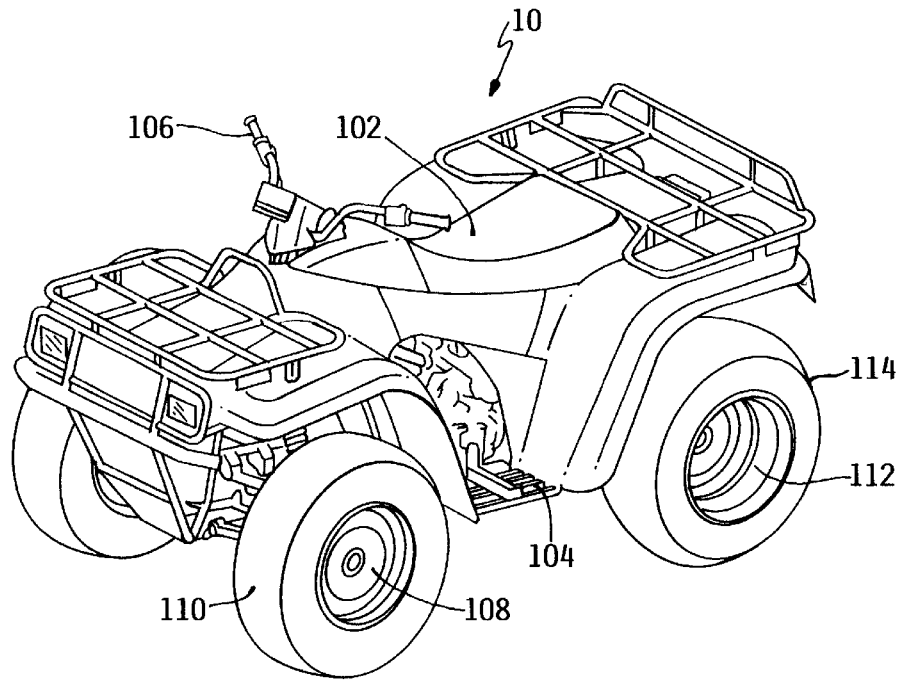
FIG. 1 is a perspective view of one embodiment of the invention.

With reference to the drawings, like reference numbers designate like or corresponding parts throughout the several views.

Overview

The all terrain vehicle which is the subject of this invention will be called ATV hereinafter. It is shown as ATV 10 in FIG. 1. The ATV 10 of FIG. 1 has an operator's seat 102, foot rests 104, handlebars 106, front wheels 108, front tires 110, rear wheels 112, and rear tires 114.

Figure 2:
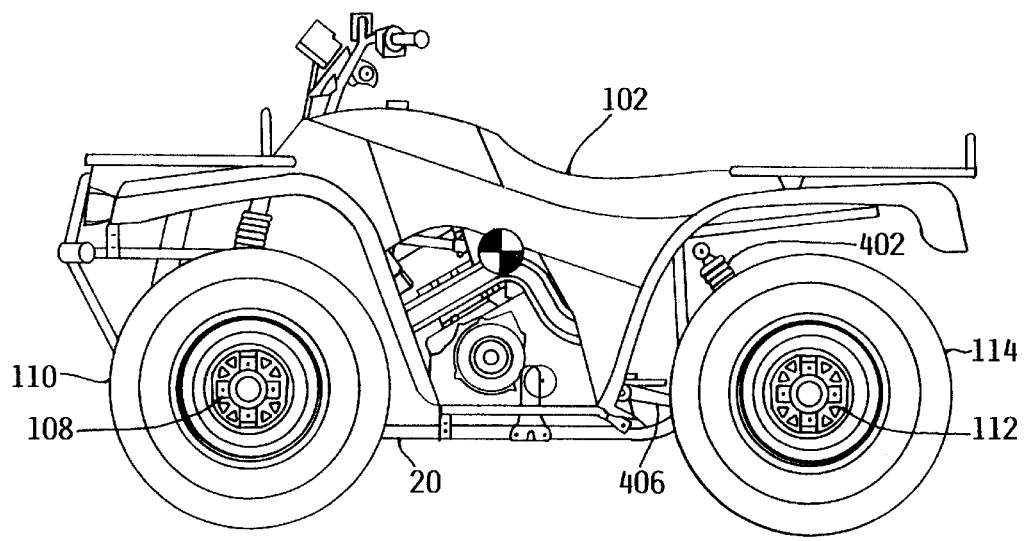
FIG. 2 is a left side view of one embodiment of the invention.

FIG. 2 depicts some of the supporting structure of the ATV, including part of the chassis 20, the left front wheel 108 and tire 110, the left rear wheel 112 and tire 114, a rear spring and shock absorber 402, and a link arm 406. The center of gravity (c.g.) of the ATV, shown as a partially shaded circle, is located near the midpoint of the vehicle, both laterally and longitudinally. In this embodiment of the invention the c.g. is located slightly forward of the midpoint between the front and rear wheels 108 and 112 at a height of about 18 inches above the ground when the vehicle is unloaded. FIG. 2 also depicts the operator's seat 102. The combined c.g. of the ATV and operator are very close to the front-to-back midpoint of the vehicle, in contrast to some conventional ATVs, in which the c.g. is located closer to the rear wheels.

The Prior Art

Figure 3:
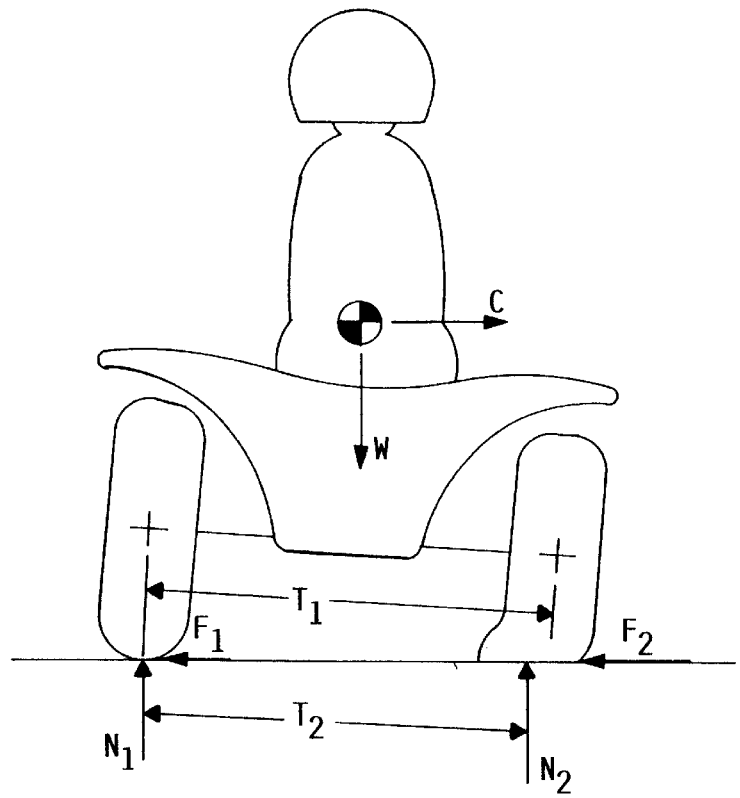
FIG. 3 is a rear view of a conventional (prior art) ATV, depicting the force loadings on the vehicle while it negotiates a left turn. The ATV operator is shown in dashed lines.

FIG. 3 shows the effects of a left turn on a conventional (prior art) ATV. The combined center of gravity of the vehicle and rider is shown as a shaded circle; the downward force W is the combined weight of the vehicle and rider and the outward force C is the centrifugal force induced by the turn.

Figure 4:
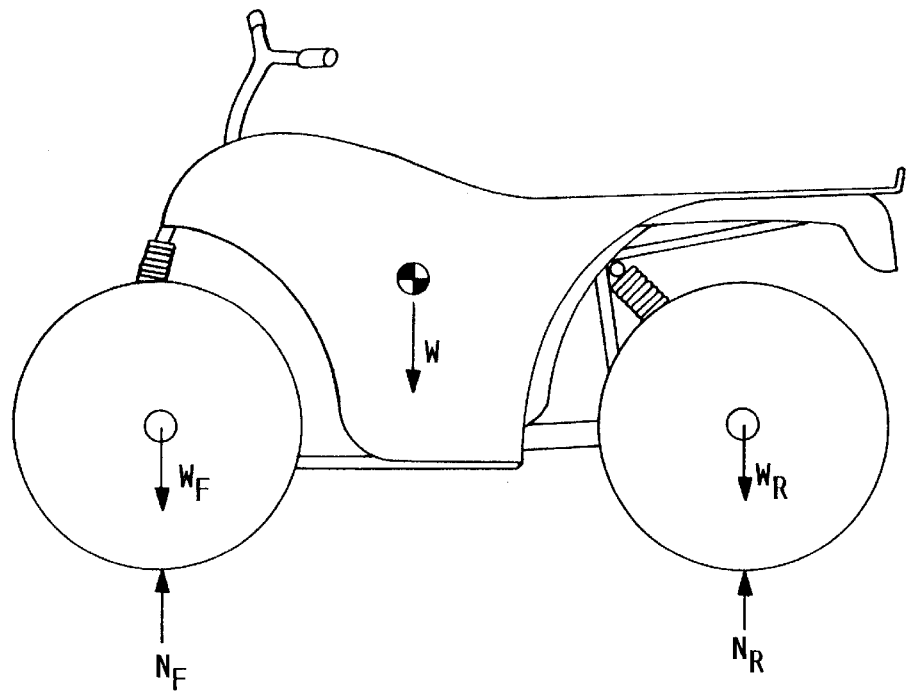
FIG. 4 is a side view of an ATV showing tire loadings.

FIG. 4 is a left side view of an ATV, showing the weight W divided between $W_F$, the weight carried by the front tires, and $W_R$, the weight carried by the rear tires. The normal (perpendicular) forces N resist the weight W. The normal forces on the left and right front tires are $N_{1F}$ and $N_{2F}$, respectively; $N_{1F}$ and $N_{2F}$ add up to $W_F$. $N_{1F}$ and $N_{2F}$ are equal when the ATV stands still or travels straight ahead. The normal forces on the left and right rear tires are $N_{1R}$ and $N_{2R}$, respectively; $N_{1R}$ and $N_{2R}$ add up to $W_R$. $N_{1R}$ and $N_{2R}$ are equal when the ATV stands still or travels straight ahead.

The forces on the rear tires are shown in FIG. 3 as $N_{1R}$, $N_{2R}$, $F_{1R}$, and $F_{2R}$. $F_{1R}$ and $F_{2R}$ are the frictional forces on the inner and outer rear tires, respectively, as the ATV makes a left turn. $F_{1R}$ is the sideways frictional force on the inner rear tire; it is proportional to $N_{1R}$. $F_{2R}$ is the sideways frictional force on the outer rear tire; it is proportional to $N_{2R}$. $F_{1R}$ and $F_{2R}$ add up to and counteract the portion of centrifugal force C resisted by the rear tires. Roll moment loading on an ATV occurs when the ATV negotiates a curve; it is the product of the centrifugal force C and the height of the c.g. of the ATV above the ground.

The forces on the front tires are similar to those on the rear tires, $N_{1F}$ being the normal force on the inner front tire and $F_{1F}$ being the proportional sideways frictional force on the inner front tire, and $N_{2F}$ being the normal force on the outer front tire and $F_{2F}$ being the proportional sideways frictional force on the outer front tire. $F_{1F}$ and $F_{2F}$ add up to and counteract the portion of centrifugal force C resisted by the front tires.

In making a turn in any vehicle, the inside wheels must travel a shorter distance than the outside wheels. In any vehicle having a solid rear axle the most common way to accomplish this is for there to be slippage on the inner rear tire. If too little weight is transferred from the inner rear tire, this tire will not slip and the vehicle will continue to push straight ahead. This phenomenon is called understeer.

In cornering with conventional ATVs, if too much weight is transferred from the inner rear tire, either by the operator or by centrifugal force, and the inner rear tire lifts from the ground, that tire no longer exerts any forward force to counteract the steering input and the vehicle will suddenly change to oversteer, driving the vehicle into a tighter curve. This increased curvature of the path of the vehicle will increase the load shift from inner to outer tires even more, and can precipitate a dramatic change in control function.

In conventional ATVs, the inner rear tire lifts from the ground surface before the inner front tire lifts, suddenly decreasing forward resistance to steering input and thereby causing the abrupt shift from understeer to oversteer. When an ATV is traveling straight ahead, the momentum vector is straight ahead. As the ATV begins a turn, a component of the momentum vector goes over the outside front wheel and the roll moment shifts normal loading from the inner front tire, $N_{1F}$, to the outer front tire as $N_{2F}$. In a conventional ATV, the normal loading $N_{1R}$ on the inner rear tire is reduced both by centrifugal force and by the operator's weight shift to the outer rear tire to accomplish the turn. The inner rear tire leaves the ground before the inner front tire does.

In a conventional ATV having soft sidewall tires, the increased force $F_2$ created to counteract centrifugal force C distorts the outer tire as shown in FIG. 3, moving its contact patch with the ground inward and tending to tilt the ATV outward. As the contact patch of the outer tire is moved inward, the track width $T_2$ is created. The track width $T_2$ is less than the original track width $T_1$. This phenomenon is greatly reduced in the invention ATV.

The solid rear axle and one-dimensional rotation of the rear suspension in a conventional ATV create a rear end which is more rigid than the front end. The solid rear axle, one-dimensional rotation of the rear suspension, and soft-sided tires of the conventional ATV combine to make it difficult to turn unless the operator transfers weight to the outside foot rest to take weight and traction off the inner rear wheel. This is a counter-intuitive maneuver which can be difficult for the inexperienced operator to master.

Other ATV manufacturers have unsuccessfully attempted to solve the problems described above; the inventors have accomplished the desired result with the subject invention. Test results graphically demonstrate that when the invention ATV negotiates curves over relatively even terrain its inner front tire consistently lifts from the ground before the inner rear tire does, thus providing continuous and consistent understeer.

The Suspension System of the Invention ATV

Figure 5:
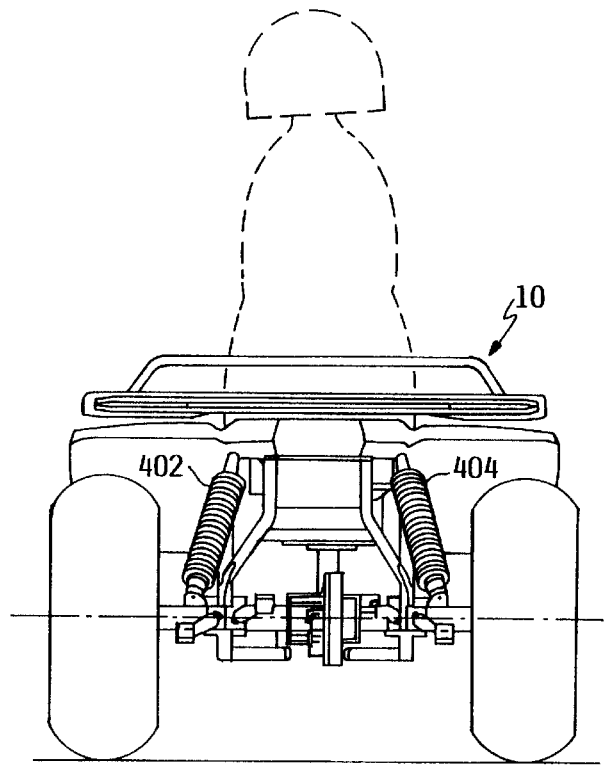
FIG. 5 is a rear view of one embodiment of the invention depicting the ATV operating on level terrain. The ATV operator is shown in dashed lines.

FIG. 5 depicts the rear view of an embodiment of the invention ATV 10 operating straight ahead on level ground. The first spring and shock absorber 402 and the second spring and shock absorber 404 are typical of those used in ATVs and are each shown encompassed by a compression spring. (See FIG. 10.)

Figure 6:
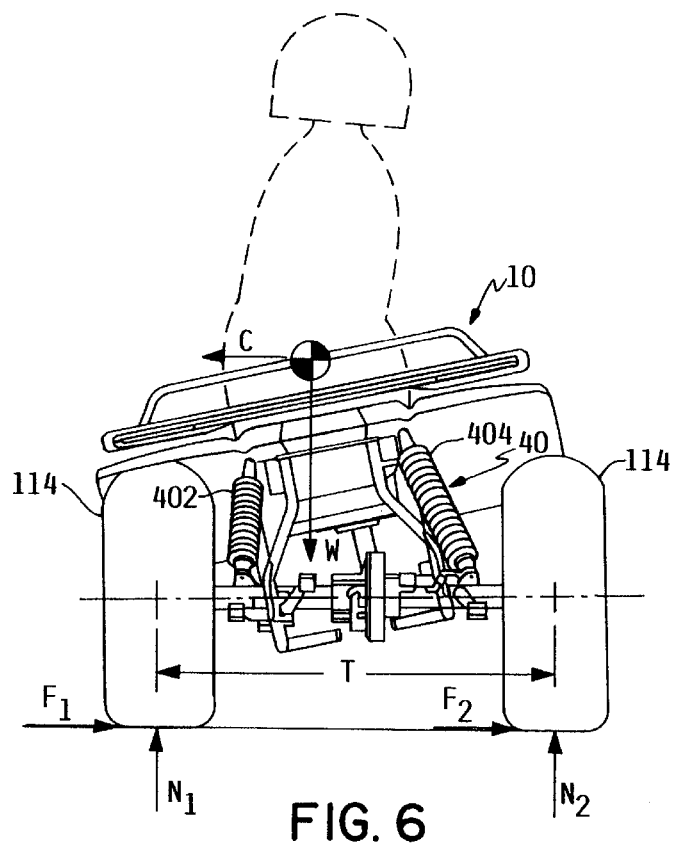
FIG. 6 is a rear view of one embodiment of the invention depicting the force loadings on the vehicle while it negotiates a right turn and depicting the rotation of the ATV chassis about the longitudinal centerline of the ATV. The ATV operator is shown in dashed lines.

FIG. 6 shows the effects of a right turn on an embodiment of the invention ATV 10. The combined center of gravity of the vehicle and rider is shown as a shaded circle; the downward force $W_R$ is the combined weight of the vehicle and rider supported by the rear tires and the outward force C is the centrifugal force occasioned by the turn. The roll moment loading on the ATV 10 when negotiating a curve is the product of the centrifugal force C and the height of the c.g. of the ATV 10 above the ground. The first spring and shock absorber 402 is compressed and the second spring and shock absorber 404 is extended. The forces on the tires are shown as $N_{1R}$, $N_{2R}$, $F_{1R}$, and $F_{2R}$. $N_{1R}$ is the normal (perpendicular) force on the inner rear tire as the ATV makes a turn; $N_{2R}$ is the normal (perpendicular) force on the outer rear tire as the ATV makes a turn; $N_{1R}$ and $N_{2R}$ add up to $W_R$.

$N_{1R}$ and $N_{2R}$ are equal when the ATV 10 stands still or travels straight ahead, but the portion of centrifugal force C generated in a turn resisted by the rear tires results in a greater portion of the total weight of the vehicle and rider being carried by the outer tire on the ATV, so that $N_{1R}$ becomes greater than $N_{2R}$ when the ATV is turning to the right.

In FIG. 6, $F_{1R}$ and $F_{2R}$ are the frictional forces on the outer and inner rear tires, respectively, as the ATV 10 makes a right turn. $F_{1R}$ is the sideways frictional force on the outer tire; it is proportional to $N_{1R}$. $F_{2R}$ is the sideways frictional force on the inner tire; it is proportional to $N_{2R}$. $F_{1R}$ and $F_{2R}$ add up to and counteract the portion of centrifugal force C resisted by the rear tires. The invention ATV 10 has relatively stiff sidewall rear tires 114, so that the increased force $F_{1R}$ created to counteract centrifugal force C does not distort the outer tire as much as in the conventional ATV of FIG. 3. Instead, the side forces $F_{1R}$ and $F_{2R}$ are transmitted through the rear tires 114 into the rear suspension system 40; the rear suspension system 40, having lateral (roll) and longitudinal (pitch) flexibility, transmits the side forces into the chassis 20 (not shown in FIG. 6).

In contrast to conventional ATVs, in the subject embodiment of this invention the inner front tire leaves the ground before the inner rear tire does when the ATV negotiates a turn, giving the desired improved handling characteristics. This is accomplished by permitting the rear axle of the ATV to rotate in two modes, roll and pitch, as the ATV negotiates a turn about a vertical axis. As the forward momentum vector component moves over the outer front wheel in a turn, body roll about the longitudinal axis of the ATV 10 is created, which compresses the front suspension of the outer front wheel. As the outer front suspension is compressed, both by the body roll and by the portion of centrifugal force C carried by the front wheels, the vehicle leans slightly forward and further increases the normal loading $N_{2F}$ on the outer front tire while reducing the normal loading $N_{1F}$ on the inner front tire.

As the normal load shift on the front wheels of the invention ATV continues, the rear tires are undergoing a normal load shift caused by the portion of centrifugal force C carried by the rear tires. The outer rear tire experiences an increase in normal force $N_{2R}$ and the inner rear tire experiences a decrease in normal force $N_{1R}$. However, because the semi-independent rear suspension of this invention ATV has more angularity of roll than the front suspension, wherein the rear axle of the ATV 10 is free to rotate in both pitch and roll while ATV 10 itself turns about a vertical axis, the inner front wheel reaches the limit of its suspension before the inner rear wheel does and the normal loading $N_{1F}$ on the inner front tire reaches zero before the normal loading $N_{1R}$ on the inner rear tire reaches zero. Although the ATV 10 can reach a point under extreme conditions where the inner rear tire will leave the ground, this will not occur until the inner front tire has left the ground.

Figure 7:
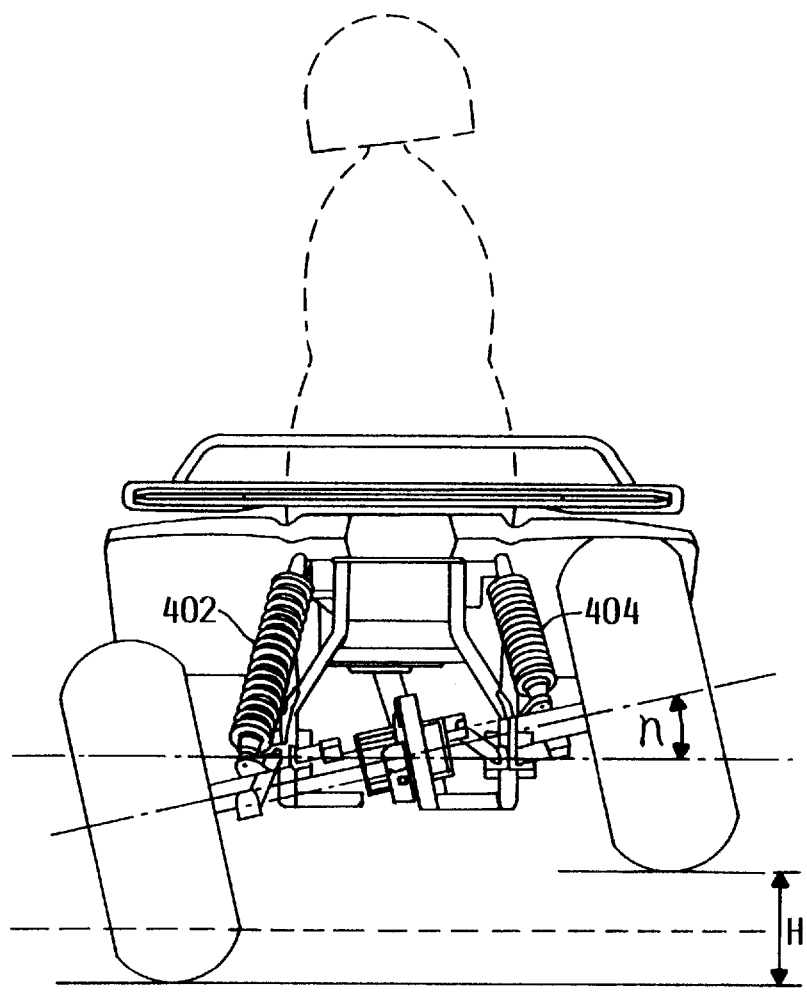
FIG. 7 is a rear view of one embodiment of the invention depicting the rotation of the rear axle of the ATV about the longitudinal centerline of the power transmission shaft when the vehicle passes over uneven terrain. The ATV operator is shown in dashed lines.

FIG. 7 depicts the ability of the invention ATV to keep both rear tires on the ground while traversing uneven terrain. Uneven terrain is defined as terrain having greater variation than that of relatively even terrain. Relatively even terrain for this invention is defined as terrain having no greater vertical variation than a peak to valley distance of three and three-quarter inches within a horizontal peak to peak distance of 50 inches. The invention ATV accomplishes this result by permitting the rear axle and power transmission shaft to rotate about the longitudinal centerline of the power transmission shaft, extending the first spring and shock absorber 402 and compressing the second spring and shock absorber 404. The dimension H of FIG. 7 depicts the sum of the drop of the left rear wheel and tire when the spring and shock absorber is fully extended and the rise of the right rear wheel and tire when the spring and shock absorber is fully compressed. The angle η represents the maximum angular rotation of the rear axle; this angle is 22 degrees in the preferred embodiment.

Figure 8:
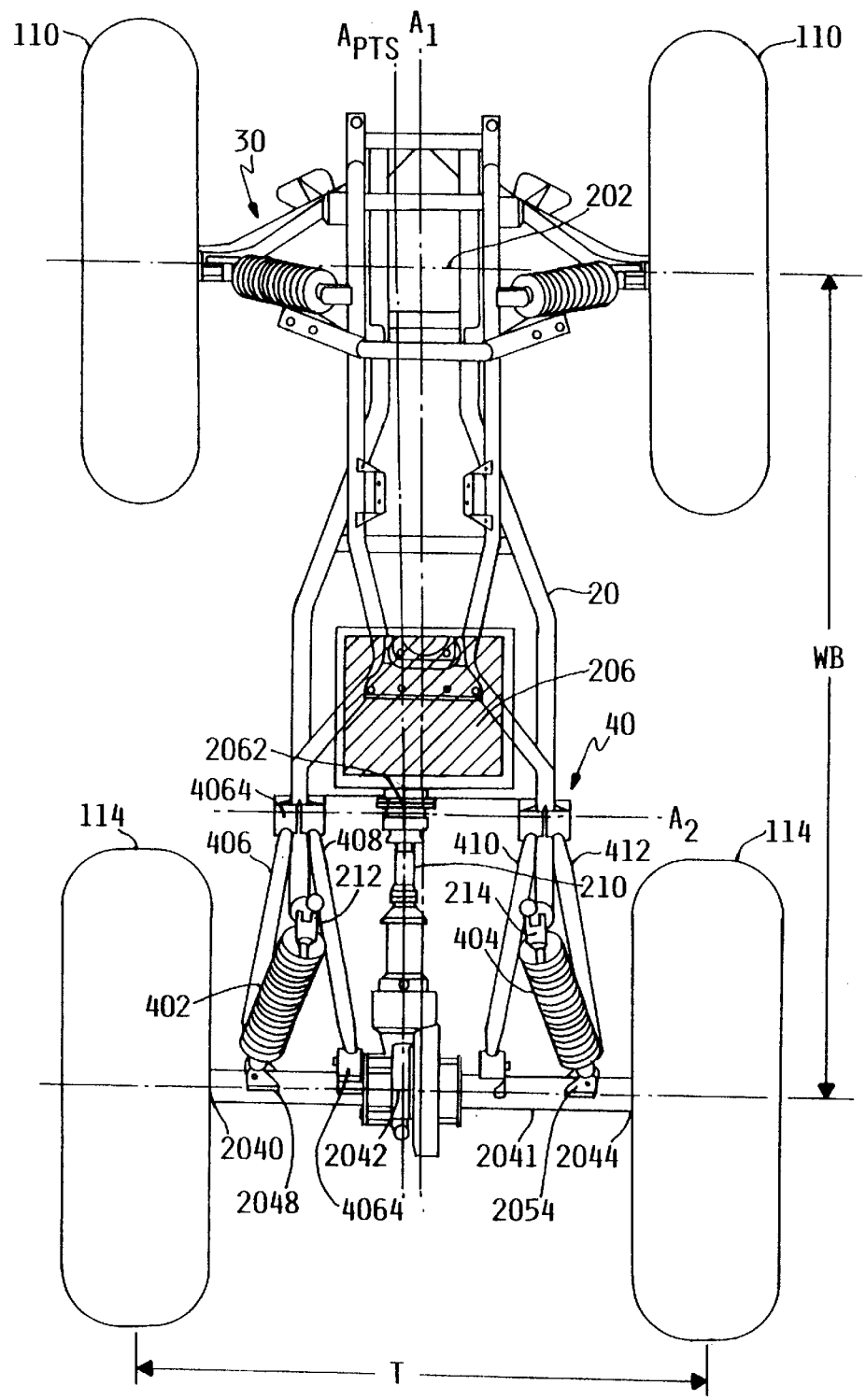
FIG. 8 is a plan view of the rear suspension system of one embodiment of the invention.

FIG. 8 is a plan view of the front and rear suspension systems 30 and 40, respectively, and a portion of the chassis 20. The front suspension system 30 is typical of that found in prior art ATVs. In the preferred embodiment of this invention the travel of the front suspension is equal to that of the rear suspension. The left side of the drawing of FIG. 8 pertains to the left side of the ATV 10 as shown in FIGS. 1 and 2. FIG. 8 shows the rear tires 114, attached (through the rear wheels 112, not shown in FIG. 8) to the ends 2040 and 2044 of the rear axle housing 2041.

The rear tires 114 have a sidewall stiffness which is relatively greater than the sidewall stiffness of rear tires on conventional ATVs. The sidewalls of the rear tires of the preferred embodiment are approximately twenty percent stiffer than those on conventional ATVs. One type of tires giving the desired stiffness is Dunlop 405A 25×10-12 for the rear tires and Dunlop 401A 25×8-12 for the front tires. The increased stiffness of the sidewalls allows the rear tires to maintain their contact patch while transferring lateral loading to the rear suspension.

The distance between the center of the rear tires 114 is the rear tread width (track) T. The rear tread width of the preferred embodiment of the invention ATV is 35 inches.

The front axle 202 supports the front tires 110 (through the front wheels 108, not shown in FIG. 8). The front axle 202 can be connected to the engine 206 through a power transmission shaft (not shown) in an ATV with front wheel drive. In an ATV without front-wheel-drive, the front axle 202 is attached to the chassis 20 through the front suspension 30.

The distance between the front axle 202 and the rear axle 204 is the wheelbase WB. The wheelbase of the preferred embodiment of the invention ATV is 50 inches.

The invention ATV has an engine 206 located between the front axle 202 and the rear axle 204. The engine 206 is connected to the chassis 20 and has a rear power outlet 2062. The rear power outlet 2062 can be located transversely within 10 percent of the rear tread width T to either side of the vehicle's center. FIG. 8 shows as $A_1$ the horizontal projection of a vertical longitudinal plane $A_1$ through the center of the ATV.

The longitudinal centerline $A_{PTS}$ of the power transmission shaft 210 of the preferred embodiment of the invention ATV passes through the rear axle 204 and the rear power outlet 2062 of the engine 206. It is generally parallel to the vehicle's vertical longitudinal plane $A_1$ and is located within 10 percent of the rear tread width T to either side of the vertical longitudinal plane $A_1$. The transverse axis $A_2$ of the invention ATV is generally horizontal, passes close to or through the rear power outlet 2062 of the engine 206, and is perpendicular to the vehicle's vertical longitudinal plane $A_1$.

FIG. 8 shows the rear axle housing 2041 interconnected at its connection point 2042 to the rear power outlet 2062 of the engine 206 through the power transmission shaft 210. The power transmission shaft 210 of the invention is connected to the rear power outlet 2062 of the engine 206 at transverse axis $A_2$.

The longitudinal centerline $A_{PTS}$ of the power transmission shaft 210 is generally parallel to, but not necessarily within, the vertical longitudinal plane $A_1$ of the ATV. The longitudinal centerline $A_{PTS}$ of the power transmission shaft 210 can be displaced from the vertical longitudinal plane $A_1$ of the ATV by a distance not exceeding 10 percent of the rear tread width T without losing the benefits of this invention. In such an embodiment, the rear power outlet 2062 of the engine 206 is displaced by an equal distance to allow for its engagement with the offset power transmission shaft 210, and the connection point 2042 on the rear axle housing 2041 is similarly offset from the middle of the rear axle. In such alternate embodiments, the link arms 406, 408, 410, and 412 are attached to the rear axle housing 2041 symmetrically to the vertical longitudinal plane $A_1$ of the ATV.

The power transmission shaft 210 is rotatably connected to the engine 206 through a constant velocity joint with high angular compliance such as is known to those reasonably skilled in the art. One example of such a joint is a BJ type constant velocity universal joint manufactured by NTN Corporation, which (1) permits transmission of drive torque from the engine to the power transmission shaft, (2) permits pitch rotation of the rear axle through 21 degrees about the transverse axis $A_2$ and (3) restricts lateral and vertical movement of the power transmission shaft 210 at the center of rotation 25 (see FIG. 9). The same constant velocity universal joint (1) permits 22 degrees of roll rotation by either (a) the rear axle 204 or (b) the chassis 20 about the longitudinal centerline $A_{PTS}$ of the power transmission shaft 210, and (2) restricts lateral movement of the rear axle. A standard connection known to those reasonably skilled in the art, such as a ring gear and pinion, connects the power transmission shaft 210 to the rear axle 204 to allow transmission of drive torque from the power transmission shaft to the rear axle. An extension of the rear axle housing 2041 projects forward from the rear axle housing to encompass a portion of the power transmission shaft 210; it contains bearings and retainers, which will be known to those reasonably skilled in the art, to allow for drive rotation of the power transmission shaft 210 while restricting lateral movement of the rear axle housing 2041. The rear axle 204 is restrained from lateral movement within the rear axle housing 2041 by bearings and retainers such as are known to those reasonably skilled in the art.

Vehicles with solid beam axles, such as ATVs, need a transverse locating device attaching them to -the chassis so that the chassis will not shift sideways relative to the axle, placing shear stress on the suspension linkage points and springs. In conventional ATVs the power transmission shaft functions only to transmit rotational drive force to the rear axle. In the present embodiment of this invention, however, the power transmission shaft 210 serves (1) as a suspension member, (2) to transmit rotational drive force to the rear axle 204, and (3) as the transverse locating member for the rear axle. Thus this invention eliminates the need for additional suspension components to serve as a transverse locating device.

Economy of manufacture is realized by using the power transmission shaft as the transverse locating member for the ATV.

FIG. 8 shows one first spring and shock absorber 402 and one second spring and shock absorber 404. However, more than one spring and shock absorber could be used as the first spring and shock absorber 402 and the second spring and shock absorber 404 without departing from the teachings of this invention. Although the spring is depicted encompassing the shock absorber in FIG. 8, the desired spring action can be attained by placing the springs in varying locations between the rear axle and the chassis. Such alternate locations will be known to those reasonably skilled in the art.

The rear axle 204 (not shown in FIG. 8) is enclosed within the rear axle housing 2041 in a manner known to those reasonably skilled in the art.

The first spring and shock absorber 402 is interconnected between the left axle bracket 2048 on the rear axle housing 2041 and the left chassis bracket 212 on the chassis 20. The left axle bracket 2048 for the first spring and shock absorber 402 is located between the left end 2040 and the power transmission shaft connection point 2042 on the rear axle housing 2041. The left axle bracket 2048 is parallel to the rear axle 204 and has a pivot connector oriented at 90 degrees to the rear axle 204 for retaining the first spring and shock absorber 402 and allowing the first spring and shock absorber 402 to pivot. The top and bottom end connections of each spring and shock absorber are substantially perpendicular to one another, thus allowing the spring and shock absorber to maintain its connection between the rear axle housing 2041 and the chassis 20 as the rear axle 204 rotates both in roll about the longitudinal centerline $A_{PTS}$ of the power transmission shaft 210 and in pitch about the transverse axis $A_2$ of the ATV at the center of rotation 25 in the preferred embodiment.

The second spring and shock absorber 404 is located symmetrically to the first spring and shock absorber 402 about the vertical longitudinal plane $A_1$ of the ATV. The second spring and shock absorber 404 is interconnected between the right axle bracket 2054 on the rear axle housing 2041 and the right chassis bracket 214 on the chassis 20. The right axle bracket 2054 for the second spring and shock absorber 404 is located between the power transmission shaft connection point 2042 and the right end 2044 of the rear axle housing 2041. The right axle bracket 2054 is parallel to the axle 204 and has a pivot connector oriented at 90 degrees to the rear axle 204 for retaining the second spring and shock absorber 402 and allowing the second spring and shock absorber 404 to pivot, thus maintaining its connection between the rear axle housing 2041 and the chassis 20 as the rear axle 204 rotates in roll about the longitudinal centerline $A_{PTS}$ of the power transmission shaft 210 and in pitch about the transverse axis $A_2$ of the ATV at the center of rotation 25 in the preferred embodiment (see center of rotation 25 on FIG. 9).

In the preferred embodiment the suspension travel of the rear suspension is equal to the suspension travel of the front suspension at 7.2 inches.

The link arms 406, 408, 410, and 412 are numbered from left to right on the vehicle. Each of the link arms 406, 408, 410, and 412 is interconnected between the rear axle housing 2041 and the chassis 20. The axle end of each of the link arms is attached to the rear axle housing 2041 through a bushing 4064; and the chassis end of each of the link arms is attached to the chassis 20 through a bushing 4064. The bushings 4064 are made of an elastomeric material such as rubber. The link arms are located symmetrically about the vertical longitudinal plane $A_1$ of the ATV. The quantity and sizes of the link arms and bushings are selected to provide sufficient flexibility to permit the link arms to maintain their connections between the rear axle housing 2041 and the chassis 20 as the rear axle 204 rotates in roll about the longitudinal centerline $A_{PTS}$ of the power transmission shaft 210 and in pitch about the transverse axis $A_2$ of the ATV. In the present embodiment of the invention ATV there are four link arms 406, 408, 410, and 410, but any symmetrical combination of link arms and bushings which will transmit the required drive thrust and give the required angular deflection can be used. Each of the link arms encompasses an elastomeric bushing 4064 at each of its ends to allow for the angular deflection of the link arms as they connect the rear axle housing 2041 with the chassis 20.

Link arms with spherical rod end bearings which will provide the required strength and flexibility might also be used without departing from the teaching of this invention. An example of an alternate spherical rod end bearing is a Heim joint, which will be known to those reasonably skilled in the art. A single link arm on each side of the chassis, having spherical rod end bearings, will conform with the teachings of this invention.

The rear suspension system 40 of the preferred embodiment of this invention is more flexible than the front suspension system 30 of the ATV; that is, the rear suspension has more angularity of roll than the front suspension, thus giving the desired results in improved handling and control of the vehicle.

Figure 9:
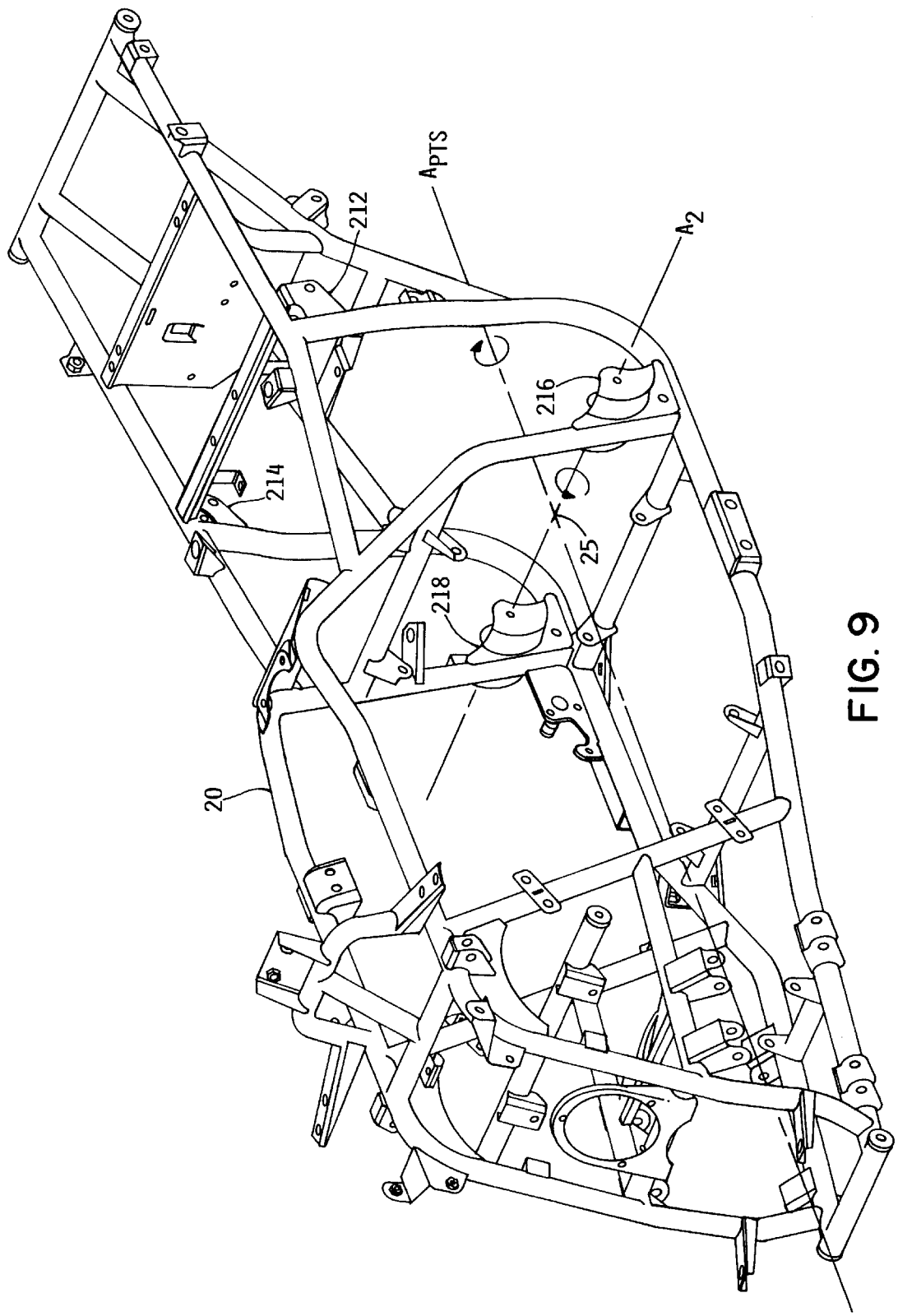
FIG. 9 is a perspective view of the chassis of one embodiment of the invention.

FIG. 9 is a perspective view of the chassis 20 as viewed from the left side. It depicts the left chassis bracket 212 for attachment of one end of the first spring and shock absorber 402 (not shown in FIG. 9) and the right chassis bracket 214 for attachment of one end of the second spring and shock absorber 404 (not shown in FIG. 9). The left and right chassis brackets 212 and 214 are symmetrically spaced with respect to vertical longitudinal plane $A_1$ of the ATV. FIG. 9 also shows the left double bracket 216 at which the chassis ends of the first link arm 406 (not shown in FIG. 9) and the second link arm 408 (not shown in FIG. 9) are attached to the chassis 20, as well as the right double bracket 218 at which the chassis ends of the third link arm 410 (not shown in FIG. 9) and the fourth link arm 412 (not shown in FIG. 9) are attached to the chassis 20. The left double bracket 216 and the right double bracket 218 are located on transverse axis $A_2$ of the ATV and they are symmetrically spaced with respect to vertical longitudinal plane $A_1$ of the ATV.

Figure 10:
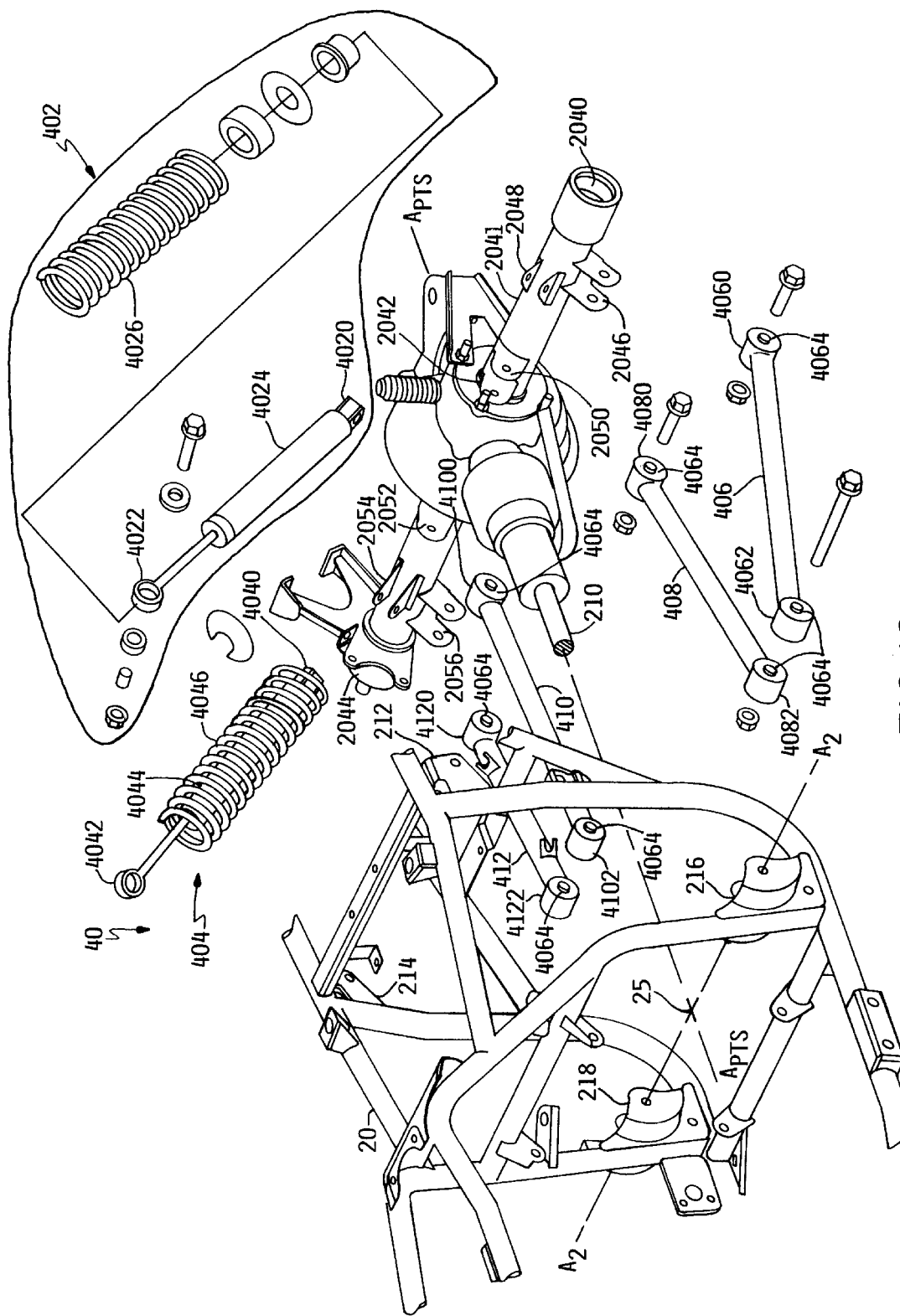
FIG. 10 is an exploded perspective view of a portion of the rear suspension system of one embodiment of the invention.

FIG. 10 is an exploded view of a portion of the rear suspension system 40 and the rear axle housing 2041 along with a portion of the chassis 20; it depicts the connections for the rear suspension members between the rear axle housing 2041 and the chassis 20.

FIG. 10 shows the power transmission shaft 210 cut for clarity of the drawing; however, it meets and connects to the rear power outlet 2062 of the engine 206 at the intersection of its longitudinal centerline $A_{PTS}$ with transverse axis $A_2$, as shown in FIG. 8.

The power transmission shaft 210 connects to the rear axle 204 at said axle's power transmission shaft connection point 2042 in the preferred embodiment. The power transmission shaft 210 of the preferred embodiment connects the rear axle 204 to the rear power outlet 2062 (not shown in FIG. 10) of the ATV's engine 206 (not shown in FIG. 10) through (1) a ring gear and pinion at the axle end of the power transmission shaft and (2) a constant velocity joint at transverse axis $A_2$ of the ATV. The constant velocity joint is configured to restrict lateral and vertical movement of the power transmission shaft 210 at the center of rotation 25 in the preferred embodiment. A standard connection known to those reasonably skilled in the art, such as a ring gear and pinion, connects the power transmission shaft 210 to the rear axle 204 to allow transmission of drive torque from the power transmission shaft to the rear axle. An extension of the rear axle housing 2041 projects forward from the rear axle housing to encompass a portion of the power transmission shaft 210; it contains bearings and retainers, which will be known to those reasonably skilled in the art, to allow for drive rotation of the power transmission shaft 210 while restricting lateral movement of the rear axle housing 2041.

The rear axle 204 is restrained from lateral movement within the rear axle housing 2041 by bearings and retainers such as are known to those reasonably skilled in the art.

The first spring and shock absorber 402 is comprised of a shock cylinder 4024 and a spring 4026, ;as known in the art. The purpose of the spring and shock absorber is to dampen the transmission of shock loading between the rear axle housing 2041 and the chassis 20. The rod end 4022 of the first spring and shock absorber 402 is pivotally attached to left chassis bracket 212 in a manner which permits said first spring and shock absorber 402 to maintain its connection to the chassis 20 as the rear axle 204 rotates in roll about the longitudinal centerline $A_{PTS}$ of the power transmission shaft 210 and in pitch about the transverse axis $A_2$ of the ATV. The rod end of the spring and shock absorber can be attached to the chassis bracket in any suitable manner. The nut, washers and bolt depicted in FIG. 10 are one method of attachment, but others will be apparent to those reasonably skilled in the art.

The base end 4020 of the first spring and shock absorber 402 is pivotally attached to the left spring and shock absorber axle bracket 2048 in a manner which permits said first spring and shock absorber 402 to maintain its connection to the rear axle housing 2041 as the rear axle 204 rotates in roll about the longitudinal centerline $A_{PTS}$ of the power transmission shaft 210 and in pitch about the transverse axis $A_2$ of the ATV. The base end of the spring and shock absorber can be attached to the axle bracket in any suitable manner. The nut and bolt depicted in FIG. 10 are one method of attachment, but others will be apparent to those reasonably skilled in the art.

The second spring and shock absorber 404 also serves to dampen the transmission of shock loading between the rear axle housing 2041 and the chassis 20. It is similar in all respects to the first spring and shock absorber 402. The second spring and shock absorber 404 is comprised of a shock cylinder 4044 and a spring 4046, as known in the art. The rod end 4042 of the second spring and shock absorber 404 is pivotally attached to right chassis bracket 214 in a manner which permits said second spring and shock absorber 404 to maintain its connection to the chassis 20 as the rear axle 204 rotates in roll about the longitudinal centerline $A_{PTS}$ of the power transmission shaft 210 and in pitch about the transverse axis $A_2$ of the ATV. The rod end of the spring and shock absorber can be attached to the chassis bracket in any suitable manner. The nut, washers and bolt depicted in FIG. 10 for the first spring and shock absorber 402 are one method of attachment, but others will be apparent to those reasonably skilled in the art.

The base end 4040 of the second spring and shock absorber 404 is pivotally attached to the right spring and shock absorber axle bracket 2054 in a manner which permits said second spring and shock absorber 404 to maintain its connection to the rear axle housing 2041 as the rear axle 204 rotates in roll about the longitudinal centerline $A_{PTS}$ of the power transmission shaft 210 and in pitch about the transverse axis $A_2$ of the ATV. The base end of the spring and shock absorber can be attached to the axle bracket in any suitable manner. The nut and bolt depicted in FIG. 10 are one method of attachment, but others will be apparent to those reasonably skilled in the art.

The left spring and shock absorber axle bracket 2048 is located on the axle 204 between the left end 2040 of the axle and the power transmission shaft connection point 2042 of the axle. The right spring and shock absorber axle bracket 2054 is located between the power transmission shaft connection point 2042 of the axle 204 and the right end 2044 of the axle. The left and right spring and shock absorber axle brackets 2048 and 2054 are symmetrically spaced with respect to the vertical longitudinal plane $A_1$ of the ATV. Although only one spring and shock absorber axle bracket is shown for each side of the axle, additional similar brackets would be used if more than one spring and shock absorber were utilized on each side of the axle.

The spring and shock absorbers 402 and 404 can be attached to the chassis 20 at either their rod ends 4022 and 4042 or their base ends 4020 and 4040, with the other end then being attached to the rear axle housing 2041.

FIG. 10 depicts the link arms 406, 408, 410, and 412, numbered from left to right. The purpose of the link arms is to transmit drive force from the rear axle housing 2041 to the chassis 20. The chassis end 4062 of the first link arm 406 is pivotally attached to left double bracket 216 through a bushing 4064 in a manner which permits said first link arm 406 to maintain its connection to the chassis 20 as the rear axle 204 rotates in roll about the longitudinal centerline $A_{PTS}$ of the power transmission shaft 210 and in pitch about the transverse axis $A_2$ of the ATV. The chassis end 4082 of the second link arm 408 is also pivotally attached to left double bracket 216 through a bushing 4064 in a manner which permits said second link arm 408 to maintain its connection to the chassis 20 as the rear axle 204 rotates in roll about the longitudinal centerline $A_{PTS}$ of the power transmission shaft 210 and in pitch about the transverse axis $A_2$ of the ATV. The chassis ends of the first and second link arms can be attached to the left double bracket 216 in any suitable manner. The nut and bolt depicted in FIG. 10 are one method of attachment, but others will be apparent to those reasonably skilled in the art.

The axle end 4060 of the first link arm 406 is pivotally attached to first link arm axle bracket 2046 through a bushing 4064 in a manner which permits said first link arm 406 to maintain its connection to the rear axle housing 2041 as the rear axle 204 rotates in roll about the longitudinal centerline $A_{PTS}$ of the power transmission shaft 210 and in pitch about the transverse axis $A_2$ of the ATV in the preferred embodiment. The axle end 4080 of the second link arm 408 is pivotally attached to second link arm axle bracket 2050 through a bushing 4064 in a manner which permits said second link arm 408 to maintain its connection to the rear axle housing 2041 as the rear axle 204 rotates in roll about the longitudinal centerline $A_{PTS}$ of the power transmission shaft 210 and in pitch about the transverse axis $A_2$ of the ATV. The axle ends of the first and second link arms can be attached to the axle brackets 2046 and 2050 in any suitable manner. The nuts and bolts depicted in FIG. 10 are one method of attachment, but others will be apparent to those reasonably skilled in the art.

The chassis end 4102 of the third link arm 410 is pivotally attached to right double bracket 218 through a bushing 4064 in a manner which permits said third link arm 410 to maintain its connection to the chassis 20 as the rear axle 204 rotates in roll about the longitudinal centerline $A_{PTS}$ of the power transmission shaft 210 and in pitch about the transverse axis $A_2$ of the ATV. The chassis end 4122 of the fourth link arm 412 is also pivotally attached to right double bracket 218 through a bushing 4064 in a manner which permits said fourth link arm 412 to maintain its connection to the chassis 20 as the rear axle 204 rotates in roll about the longitudinal centerline $A_{PTS}$ of the power transmission shaft 210 and in pitch about the transverse axis $A_2$ of the ATV in the preferred embodiment. The chassis ends of the third and fourth link arms can be attached to the right double bracket 218 in any suitable manner. The nut and bolt depicted in FIG. 10 are one method of attachment, but others will be apparent to those reasonably skilled in the art.

The axle end 4100 of the third link arm 410 is pivotally attached to third link arm axle bracket 2052 through a bushing 4064 in a manner which permits said third link arm 410 to maintain its connection to the rear axle housing 2041 as the rear axle 204 rotates in roll about the longitudinal centerline $A_{PTS}$ of the power transmission shaft 210 and in pitch about the transverse axis $A_2$ of the ATV. The axle end 4120 of the fourth link arm 412 is pivotally attached to fourth link arm axle bracket 2056 through a bushing 4064 in a manner which permits said fourth link arm 412 to maintain its connection to the rear axle housing 2041 as the rear axle 204 rotates in roll about the longitudinal centerline $A_{PTS}$ of the power transmission shaft 210 and in pitch about the transverse axis $A_2$ of the ATV. The axle ends of the third and fourth link arms can be attached to the axle brackets 2052 and 2056 in any suitable manner. The nuts and bolts depicted in FIG. 10 are one method of attachment, but others will be apparent to those reasonably skilled in the art.

The left and right link arm axle brackets 2046, 2050, 2052, and 2056 are symmetrically spaced with respect to vertical longitudinal plane $A_1$ of the ATV. More or less than two link arms and related brackets can be used on each side of the chassis without departing from the spirit of this invention.

Figure 11:
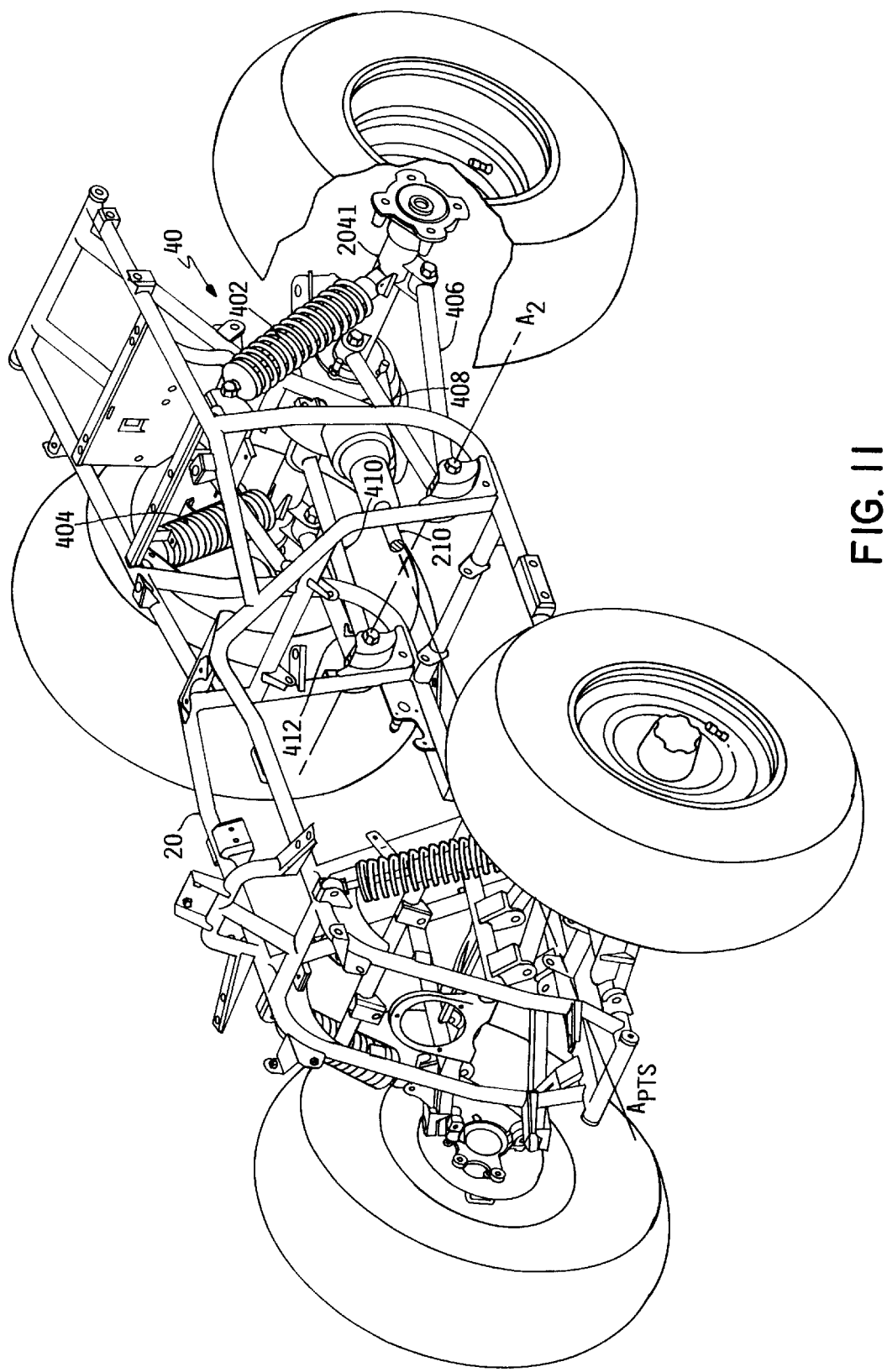
FIG. 11 is a perspective view of the front and rear suspension systems as connected to the chassis in one embodiment of the invention. The wheels and tires are depicted transparently for clarity.
Figure 17:
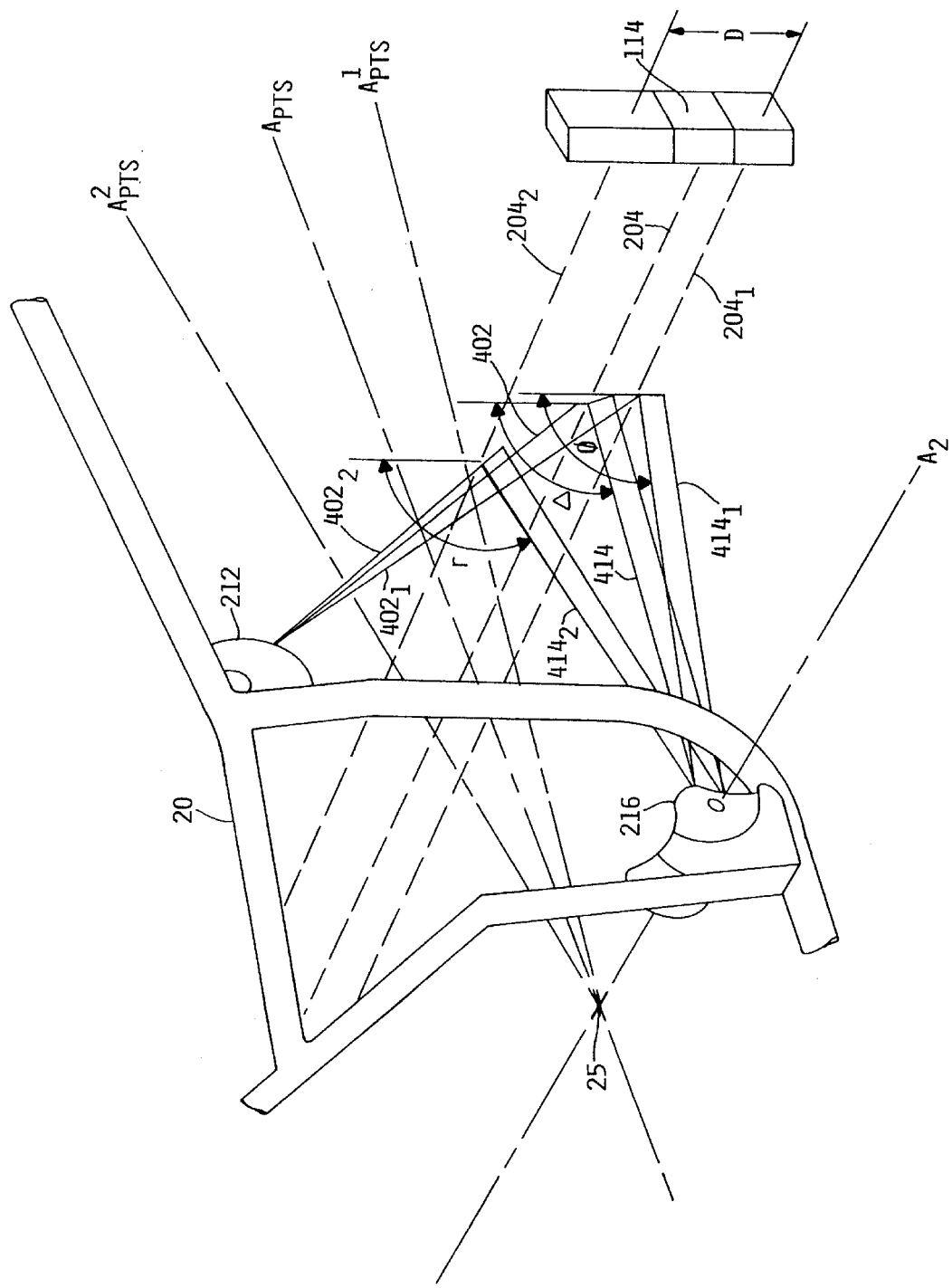
FIG. 17 is a perspective schematic diagram of the left side of the ATV depicting movement of an effective link arm and one of the springs and shock absorbers as the rear axle rotates in pitch about the transverse axis of the ATV, showing the changes in the vertical angle between the link arm and the rear axle.
Figure 18:
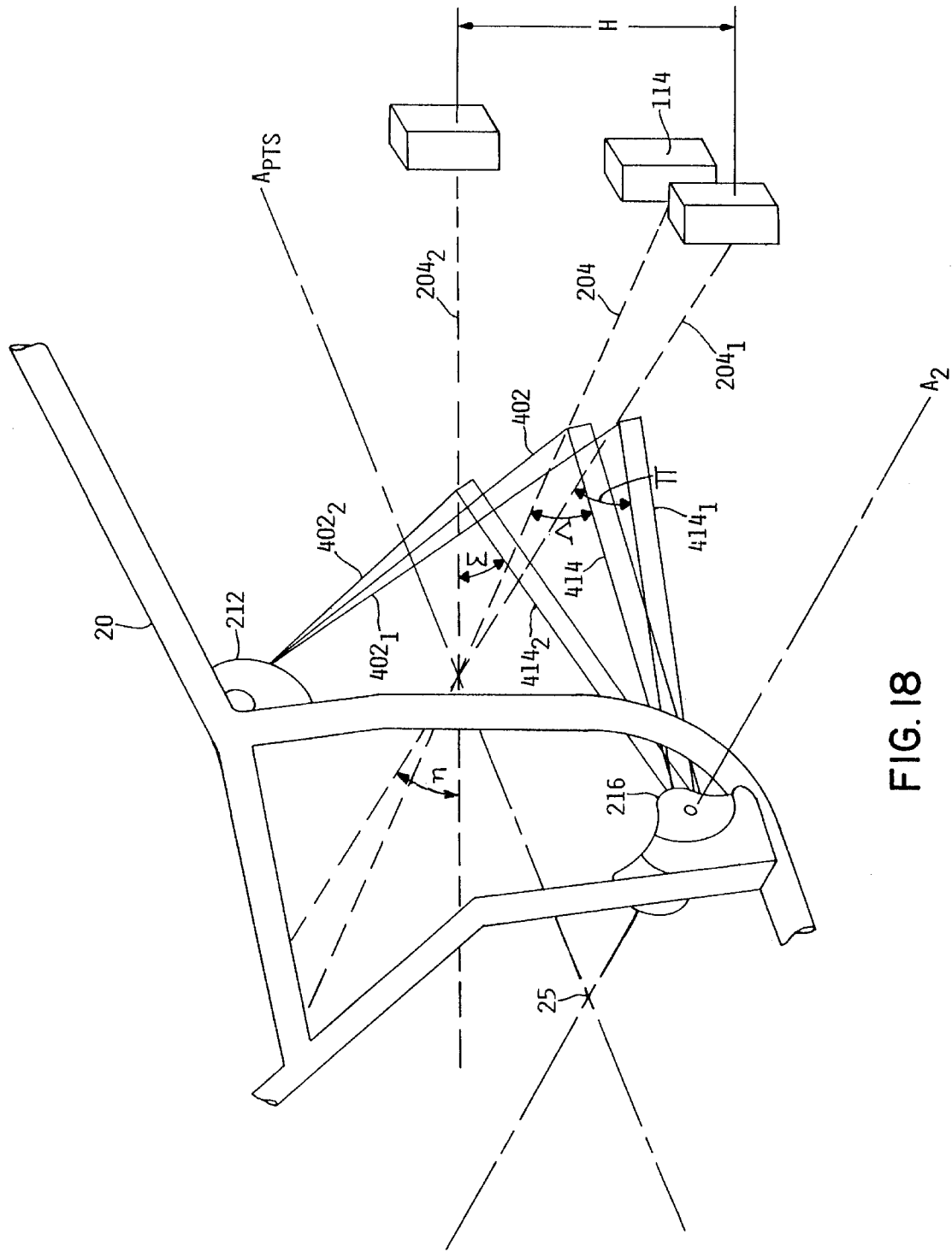
FIG. 18 is a perspective schematic diagram of the left side of the ATV depicting movement of an effective link arm and one of the springs and shock absorbers as the chassis rotates in roll about the longitudinal centerline of the power transmission shaft, showing the changes in the horizontal angle between the link arm and the rear axle.
Figure 19:
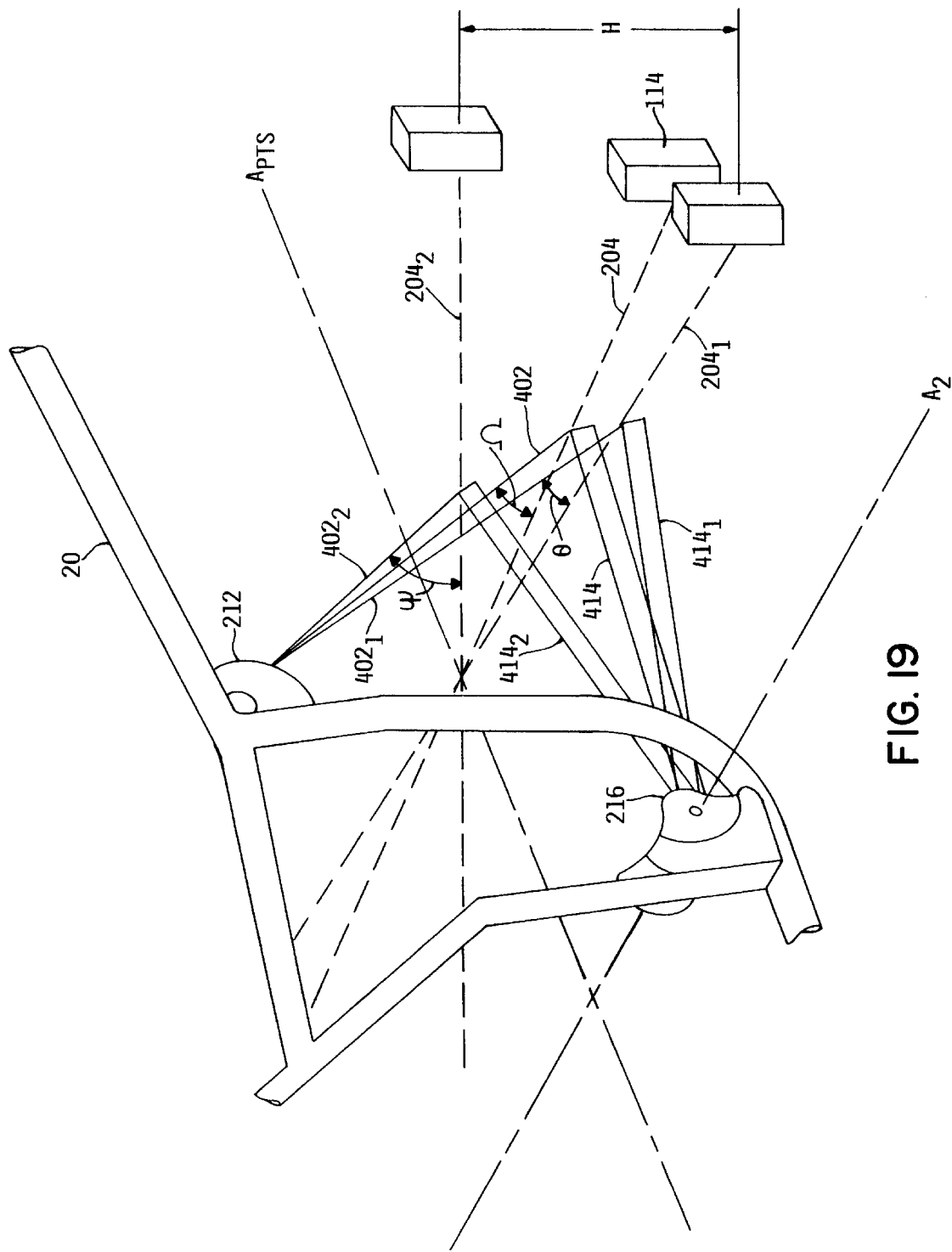
FIG. 19 is a perspective schematic diagram of the left side of the ATV depicting movement of an effective link arm and one of the springs and shock absorbers as the chassis rotates in roll about the longitudinal centerline of the power transmission shaft, showing the changes in the vertical angle between the spring and shock absorber and the rear axle.

FIG. 11 shows the relationship between the rear axle housing 2041 and the chassis 20 as they are attached through the rear suspension system 40. As shown in FIGS. 10 and 11, the four link arms 406, 408, 410, and 412 are generally horizontal and the two springs and spring and shock absorbers 402 and 404 are generally inclined. In the preferred embodiment of the invention ATV the first link arm 406 and the fourth link arm 412 are seven degrees below horizontal and the second link arm 408 and the third link arm 410 are three degrees above horizontal. The combination of the first link arm 406 and the second link arm 408 create an imaginary effective link arm 414 (not shown in FIG. 11) which is within four degrees of horizontal in the preferred embodiment. Alternative embodiments in which the effective link arms are within fourteen degrees of horizontal will give the improved results and are within the teaching of this invention. The effective link arm 414 is shown in FIGS. 17–19. The effective link arms 414 impart generally horizontal thrust loading on the chassis 20. Any combination and orientation of link arms which combine to create the effective link arm 414, including only one link arm on each side of the chassis, can be used without departing from the teachings of this invention. The effective link arms are of sufficient size, length, and orientation to transmit drive thrust from the rear axle without inducing jacking or lowering effect on the chassis under acceleration or deceleration of the ATV. The elimination of jacking and lowering effects maintains the height of the center of gravity of the ATV and provides improved handling and control characteristics.

The size of the link arms will be determined by the size of the engine and of the ATV and by the number of link arms used and will be known to those reasonably skilled in the art. The length of the link arms will be determined by the size and geometry of the ATV and will be known to those reasonably skilled in the art. The orientation of the link arms must be such as will create effective link arms which will not induce significant jacking or lowering effects on the chassis under acceleration or deceleration.

FIG. 11 shows the power transmission shaft 210 cut for clarity of the drawing; however, it meets and connects to the rear power outlet 2062 of the engine 206 at or near the intersection of its longitudinal centerline $A_{PTS}$ and transverse axis $A_2$, as shown in FIG. 8.

Figure 12:
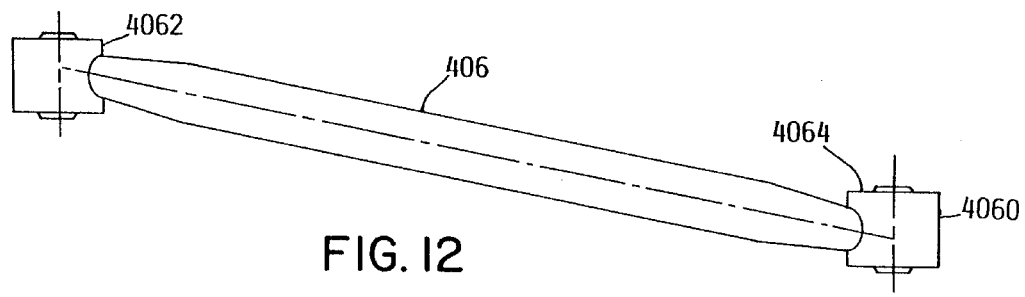
FIG. 12 is a top view of one of the link arms of one embodiment of the invention.
Figure 13:
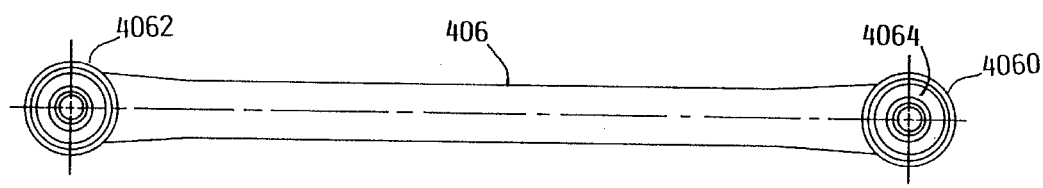
FIG. 13 is a side view of one of the link arms of one embodiment of the invention.

FIG. 12 depicts a top view and FIG. 13 shows a side view of a typical link arm 406. Each end of each link arm incorporates a space for the insertion of an elastomeric bushing 4064.

Figure 14:
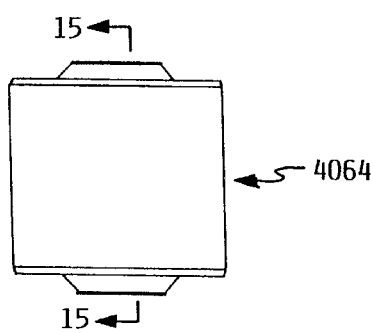
FIG. 14 is a top view of the bushing used at each end of the link arms in the rear suspension system of one embodiment of the invention.
Figure 15:
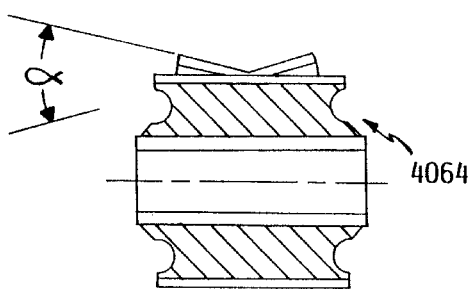
FIG. 15 is a section view of the bushing of FIG. 14 through the line 15—15 of FIG. 14; it depicts the deflection capability of the bushing.
Figure 16:
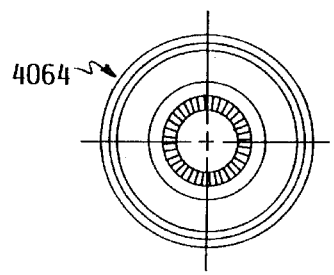
FIG. 16 is an end view of the bushing of FIG. 14.

FIGS. 14 through 16 depict the elastomeric bushing 4064 which is used in the preferred embodiment of the invention ATV. The elastomeric bushing 4064 is built as a rubber insert in a steel tube; there is a center tube through the insert for insertion of connecting bolts. The sum of the widths of the bushings 4064 must be sufficient to transmit drive thrust from the rear axle 204 to the chassis 20, while the width of each bushing 4064 must be small enough to permit the necessary angular flexure. Other elastomeric materials, which will be known to those skilled in the art, can also be used. As shown in FIG. 15, the connection used must have a usable flexure of $\alpha$ degrees to give the flexibility needed for the ends of the link arms. In the subject embodiment of this invention, the usable flexure angle $\alpha$ is 9 degrees.

OPERATION AND USE

When operating the ATV 10, the operator sits on the operator's seat 102 with his feet on the foot rests 104 and his hands gripping the handlebars 106. The operator imparts steering control to the ATV by turning the handlebars 106 which are interconnected with the front wheels 108. FIGS. 17 through 19 show the variable relationship between the link arms, the springs and shock absorbers, and the rear axle during operation of this embodiment of the invention ATV.

Pitch Rotation of Rear Axle about Transverse Axis of the ATV

FIG. 17 is a perspective schematic view of the relationship between chassis 20, effective link arm 414, first spring and shock absorber 402, and rear axle 204 during operation of this embodiment of the invention ATV straight ahead on level terrain. When operating straight ahead on level terrain the rear axle of this and all conventional ATVs moves up and down as the rear axle rotates in pitch about a transverse axis of the ATV. When operating on level terrain the first spring and shock absorber 402 and the second spring and shock absorber 404 are extended equally. In this mode of operation the invention ATV functions similarly to conventional ATVs, in that the rear axle remains parallel to the ground.

As shown in FIG. 11, the link arms of this invention ATV are generally horizontal. With the link arms being generally horizontal, the thrust they transmit to the chassis 20 from the driven rear axle 204 is forward thrust, without significant lift. In contrast, conventional ATVs with swing arms which slope upward from the rear axle impart a lift to the chassis when the vehicle is accelerated; this lift, or jacking effect, tends to raise the ATV's center of gravity and thus contributes to changes in handling characteristics. The generally horizontal link arms of this embodiment of the invention ATV do not impart such lift to the chassis.

In FIG. 17 depicting this embodiment of the invention ATV, the effective link arm 414 is depicted as a bar, the first spring and shock absorber 402 is depicted as a solid line, and the rear axle 204 is represented by a dashed line ending at rear tires 114. Only the left rear tires are depicted in FIG. 17. The rear tires 114 are depicted as rectangular boxes for the sake of simplicity in this drawing. When the ATV is moving straight ahead at constant speed over level terrain with an operator in the seat, the effective link arm 414 will be at its middle position in FIG. 17. The angle Δ is formed between the effective link arm 414 and an imaginary vertical line.

As the ATV operates on some terrain, the rear axle 204 can rotate downward in relation to the chassis 20, about the transverse axis $A_2$, and can move to position $204_1$. With the rear axle at position $204_1$ the effective link arm will be at position $414_1$, the spring and shock absorber will be extended at $402_1$, and the angle Φ is formed between the effective link arm $414_1$ and an imaginary vertical line. When terrain changes occur, the rear axle 204 can rotate upward in relation to the chassis 20, about the transverse axis $A_2$; it can reach position $204_2$. At this point the first spring and shock absorber is compressed as $402_2$, the effective link arm is at position $414_2$, and there is an angle Γ between the effective link arm $414_2$ and an imaginary vertical line. As the rear axle moves vertically through the height D in this embodiment of the invention ATV, the angular orientation of the effective link arm changes by the difference between angles Γ and Φ. Thus the connections between the link arms and the rear axle must have the ability to rotate through sufficient degrees in the vertical direction to achieve the desired function. In this embodiment of the invention ATV, the distance D is 7.2 inches and the link arm angular change can reach 21 degrees.

Roll Rotation of Rear Axle about Longitudinal Centerline of the Power Transmission Shaft FIG. 18 is a perspective schematic view of the relationship between chassis 20, effective link arm 414, first spring and shock absorber 402, and rear axle 204 during operation of this embodiment of the invention ATV over uneven terrain or through curves. When operating over uneven terrain or through curves the rear axle of conventional ATVs cannot rotate in roll about the longitudinal centerline of the power transmission shaft as does the invention ATV. In this embodiment of the invention ATV, the rear axle 204 can rotate in roll through an angle η of 22 degrees about the longitudinal centerline $A_{PTS}$ of the power transmission shaft 210 and the dimension H can reach 7.84 inches. Keeping both rear tires on the ground at all times provides constant drive force to the ATV 10. Conventional ATVs which have rigid rear axles and one-dimensional rotation of their rear suspensions do not have this ability to keep both rear tires on the ground to give more constant drive forces.

In FIG. 18 the effective link arm 414 is depicted as a bar, the first spring and shock absorber 402 is depicted as a solid line, and the rear axle 204 is represented by a dashed line ending at rear tires 114; only the left rear tires 114 are shown; they are depicted as rectangular boxes for the sake of simplicity in this drawing. When the invention ATV is moving straight ahead over even terrain with an operator in the seat, the effective link arm 414 will be at its middle position in FIG. 18. The angle A is formed between the effective link arm 414 and the rear axle 204. As the ATV 10 makes a left turn, the chassis 20 rotates in roll about the longitudinal centerline $A_{PTS}$ of the power transmission shaft 210 and the left end of the rear axle 204 moves downward in relation to the chassis 20; it can move to position $204_1$. With the rear axle at position $204_1$ the effective link arm will be at position $414_1$, the spring and shock absorber will be extended at $402_1$, and the angle Π is formed between the effective link arm $414_1$ and the rear axle $204_1$. When the ATV 10 makes a right turn as shown in FIG. 6, the chassis 20 rotates in roll about the longitudinal centerline $A_{PTS}$ of the power transmission shaft 210 and the left end of the rear axle 204 moves upward in relation to the chassis 20; it can reach position $204_2$. At this point the first spring and shock absorber is compressed as $402_2$, the effective link arm is at position $414_2$, and there is an angle Σ between the effective link arm $414_2$ and the rear axle $204_2$. As the left end of the rear axle moves vertically through the height H in this embodiment of the invention ATV, the angular orientation of the effective link arm in relation to the rear axle changes by the difference between angles Σ and Π. The connections between the link arms and the rear axle must have the ability to rotate through sufficient degrees in the horizontal direction to achieve the desired function. In this embodiment of the invention ATV, the total angular change between the link arm and the rear axle can be 22 degrees.

FIG. 19 is identical to FIG. 18 except that it shows the angular relationship between first spring and shock absorber 402 and rear axle 204 during operation of this embodiment of the invention ATV. When the ATV 10 is moving straight ahead over even terrain with an operator in the seat, the rear axle 204 will be at its middle position in FIG. 19. The angle Ω is formed between the spring and shock absorber 402 and the rear axle 204. As the ATV makes a left turn, the chassis 20 rotates in roll about the longitudinal centerline $A_{PTS}$ and the left end of the rear axle 204 moves downward in relation to the chassis 20; it can move to position $204_1$. With the rear axle at position $204_1$ the effective link arm will be at position $414_1$, the spring and shock absorber will be extended at $402_1$, and the angle θ is formed between the spring and shock absorber $402_1$ and the rear axle $204_1$. When the ATV makes a right turn as shown in FIG. 6, the chassis 20 rotates in roll about the longitudinal centerline $A_{PTS}$, and the left end of the rear axle 204 moves upward in relation to the chassis 20; it can reach position $204_2$. At this point the first spring and shock absorber is compressed as $402_2$, the effective link arm is at position $414_2$, and there is an angle Ψ between the spring and shock absorber $402_2$ and the rear axle $204_2$. As the left end of the rear axle moves vertically through the height H in this embodiment of the invention ATV, the angular orientation of the spring and shock absorber in relation to the rear axle changes by the difference between angles θ and Ψ. The connections between the springs and spring and shock absorbers and the rear axle must have the ability to rotate through sufficient degrees in the horizontal direction to achieve the desired function. In this embodiment of the invention ATV, the rear axle connections for the spring and shock absorber are perpendicular to the rear axle to allow the springs and spring and shock absorbers to pivot as the rear axle rotates about the longitudinal centerline $A_{PTS}$ of the power transmission shaft 210.

The flexibility of the rear suspension system 40 allows the rider to lean into the curve when making a turn, an intuitive move which is the same as if he were operating a bicycle or a motorcycle. This is in contrast to conventional ATVs, in which the operator must transfer his weight to the outside foot rest in a turn. The semi-independent suspension of this embodiment of the invention ATV allows the rear axle to rotate in roll with respect to the longitudinal centerline of the power transmission shaft 210 and in pitch with respect to the transverse axis of the ATV; in this respect it differs from conventional ATVs in which the rigid rear axle and rear suspension cannot rotate in the roll mode with respect to the power transmission shaft.

In the subject embodiment of this invention, if the inner front tire leaves the ground under extreme conditions, it will be before the inner rear tire does, giving the desired improved handling characteristics. This is accomplished by permitting the rear axle of the ATV to rotate in two modes, roll and pitch, as the ATV negotiates a turn about a vertical axis. As the forward momentum vector component moves over the outer front wheel, body roll about the longitudinal centerline $A_{PTS}$ of the power transmission shaft 210 is created, which compresses the front suspension of the outer front wheel. As the outer front suspension is compressed, both by the body roll and by the portion of centrifugal force C carried by the front wheels, the vehicle leans slightly forward and further increases the normal loading $N_{2F}$ on the outer front tire while reducing the normal loading $N_{1F}$ on the inner front tire.

As the normal load shift on the front tires of the invention ATV continues, the rear tires are undergoing a normal load shift caused by the portion of centrifugal force C carried by the rear wheels. The outer rear tire experiences an increase in normal force $N_{2R}$ and the inner rear tire experiences a decrease in normal force $N_{1R}$. However, because the rear axle of the ATV 10 is free to rotate in both pitch and roll while ATV 10 itself rotates about a vertical axis, the inner front wheel reaches the limit of its suspension before the inner rear wheel does and the normal loading $N_{1F}$ on the inner front tire reaches zero before the normal loading $N_{1R}$ on the inner rear tire reaches zero. Under normal operating conditions the invention ATV provides continuous and consistent understeer. Although the ATV 10 can reach a point under extreme conditions where the inner rear tire will leave the ground, this will not occur until the inner front tire has left the ground.

What is claimed is:

1. An all terrain vehicle for operation on varying terrain comprising a chassis, an engine, two front wheels and tires, a front suspension interconnecting the front wheels and tires to the chassis, two rear wheels and tires, a rear axle interconnecting the rear wheels to each other, and semi-independent rear suspension means interconnecting the rear axle to the chassis so that, in travel over relatively even terrain, roll moment loading on the all terrain vehicle will cause a front tire to lose contact with the terrain before any rear tire loses contact with the terrain, thereby maintaining understeer in the all terrain vehicle.

2. An all terrain vehicle for operation on varying terrain comprising a chassis, an engine, two front wheels and tires, a front suspension interconnecting the front wheels and tires to the chassis, two rear wheels and tires, a rear axle interconnecting the rear wheels to each other, and semi-independent rear suspension means interconnecting the rear axle to the chassis so that centrifugal force loading on the all terrain vehicle traveling over relatively even terrain will cause a front tire to lose contact with the terrain before any rear tire loses contact with the terrain, thereby maintaining understeer in the all terrain vehicle.

3. An all terrain vehicle for operation on varying terrain comprising a chassis, an engine, front wheels and tires, a front suspension interconnecting the front wheels and tires to the chassis, two rear wheels and tires, a rear axle interconnecting the rear wheels to each other, and semi-independent rear suspension means interconnecting the rear axle to the chassis so that, if the all terrain vehicle is able to maintain all of its tires on a given terrain when negotiating a curve of given radius at one speed, negotiating said curve at a higher speed will not cause any rear tire of the all terrain vehicle to lose contact with said terrain prior to a front tire losing contact with said terrain, thereby maintaining understeer in the all terrain vehicle.

4. An all terrain vehicle for operation on varying terrain comprising a chassis, an engine, two front wheels and tires, a front suspension interconnecting the front wheels and tires to the chassis, two rear wheels and tires, a rear axle interconnecting the rear wheels to each other, and semi-independent rear suspension means interconnecting the rear axle to the chassis, the semi-independent rear suspension allowing the rear axle to rotate in both roll and pitch modes, so that both rear tires are kept in contact with relatively even terrain whenever the front tires are in contact with relatively even terrain, thereby maintaining understeer in the all terrain vehicle.

5. An all terrain vehicle for operation on varying terrain comprising a chassis, an engine, two front wheels and tires, a front suspension interconnecting the front wheels and tires to the chassis, two rear wheels and tires, a rear axle interconnecting the rear wheels to each other, and a semi-independent rear suspension interconnecting the rear axle to the chassis, the semi-independent rear suspension allowing the rear axle to rotate in both roll and pitch modes, thereby keeping both rear tires in contact with relatively even terrain whenever the front tires are in contact with relatively even terrain, and thereby maintaining understeer in the all terrain vehicle; in said all terrain vehicle, the chassis has a left side and a right side, left and right being defined as a seated operator would view them; the rear axle is generally horizontal and comprises a left end, a middle, and a right end, and has at least one rear wheel and one tire at each of its ends; the left and right rear wheels and tires are spaced from each other at a rear tread width (track); the engine is located longitudinally between the front wheels and the rear axle, and the engine is connected to the chassis and has a rear power outlet; the all terrain vehicle has a vertical longitudinal plane passing through its center and passing through the rear axle; the rear power outlet of the engine is located within ten percent of the rear tread width (track) to either side of the vertical longitudinal plane; the all terrain vehicle has a horizontal transverse axis which is perpendicular to the vertical longitudinal plane and passes through the rear power outlet of the engine; and the all terrain vehicle has a semi-independent rear suspension which has more angularity of roll than the front suspension, comprising:

a. a power transmission shaft having a longitudinal centerline which is generally parallel to, and located within ten percent of the rear tread width to either side of, the vertical longitudinal plane and interconnected between the rear power outlet of the engine and the rear axle, said power transmission shaft (1) connected to the rear power outlet of the engine through a joint with high angular compliance in a manner that (a) permits drive rotation of the power transmission shaft about its longitudinal centerline, (b) permits pitch rotation of the rear axle about the transverse axis of the all terrain vehicle, (c) restricts lateral and vertical movement of the power transmission shaft at said joint, (d) permits roll rotation of the rear axle about the longitudinal centerline of the power transmission shaft, and (e) restricts lateral movement of the rear axle;

(2) connected to the rear axle in a manner that permits transmission of drive torque from the power transmission shaft to the rear axle; and b. a rear suspension linkage interconnected between the rear axle and the chassis, said rear suspension linkage comprising (1) one or more first springs and shock absorbers on the left side of the all terrain vehicle, and one or more second springs and shock absorbers on the right side of the all terrain vehicle, each of said springs and shock absorbers having a base end and a rod end, (a) the first of the ends, either the base end or the rod end, pivotally connected to the chassis at a point on the left side of the center of the chassis for the first springs and shock absorbers and on the right side of the center of the chassis for the second springs and shock absorbers, and (b) the second of the ends, either the rod end or the base end, oriented substantially perpendicular to the first end connection and pivotally connected to the rear axle at a point between the left end of the rear axle and the connection of the power transmission shaft to the rear axle for the first springs and shock absorbers and between the right end of the rear axle and the connection of the power transmission shaft to the rear axle for the second springs and shock absorbers;

(c) each of the ends being connected to the chassis or to the rear axle in a manner that permits the springs and shock absorbers to maintain their connections as the rear axle rotates in roll about the longitudinal centerline of the power transmission shaft and in pitch about the transverse axis of the all terrain vehicle; and (d) the first and second springs and shock absorbers being symmetrical to each other about the vertical longitudinal plane of the all terrain vehicle;

(2) one or more left link arms on the left side of the all terrain vehicle and one or more right link arms on the right side of the all terrain vehicle, each of said link arms comprising an axle end and a chassis end, (a) the axle end of each of the one or more left and right link arms pivotally connected to the rear axle at a point between the left end of the rear axle and the connection of the power transmission shaft to the rear axle for the left link arms and between the right end of the rear axle and the connection of the power transmission shaft to the rear axle for the right link arms;

(b) the chassis end of each of the one or more left and right link arms pivotally connected to the left side of the chassis for the left link arms and the right side of the chassis for the right link arms;

(c) each of the ends connected to the rear axle or the chassis in a manner that permits said link arms to maintain their connections as the rear axle rotates in roll about the longitudinal centerline of the power transmission shaft and in pitch about the transverse axis of the all terrain vehicle;

(d) the one or more left link arms functioning to create an effective left link arm, and the one or more right link arms functioning to create an effective right link arm, of sufficient size, length, and orientation to transmit drive thrust from the rear axle to the chassis;

(e) the relationship between the left and right link arms being symmetrical about the vertical longitudinal plane of the all terrain vehicle.

6. An all terrain vehicle having a chassis, an engine, two front wheels and tires, a front suspension interconnecting the front wheels and tires to the chassis, two rear wheels and tires, a rear axle interconnecting the rear wheels to each other, a semi-independent rear suspension means interconnecting the rear axle to the chassis, the said rear suspension means comprising two or more link arms, two or more springs and shock absorbers, and a power transmission shaft between the rear axle and the engine, said power transmission shaft having a longitudinal axis, so that the rear axle can rotate approximately twenty-two degrees in roll about the longitudinal axis of the power transmission shaft and can rotate approximately twenty-one degrees in pitch about a transverse axis of the ATV, thereby providing continuous and consistent understeer.

7. In an all terrain vehicle having a vertical longitudinal plane through its center and having a transverse axis perpendicular to said vertical longitudinal plane, having a chassis, having front wheels and tires, having a front suspension connecting the front wheels and tires to the chassis, having an engine, having two rear wheels and tires, and having a rear axle connecting the two rear wheels to each other, a semi-independent rear suspension to give improved control and handling of the all terrain vehicle, comprising:

a. a power transmission shaft having a longitudinal centerline, said longitudinal centerline lying within the vertical longitudinal plane, to (1) transmit rotational drive torque to the rear axle and (2) provide lateral stability to the rear axle;

b. a connection between the engine and the power transmission shaft which (1) permits transmission of drive torque from the engine to the power transmission shaft; (2) permits pitch rotation of the rear axle about the transverse axis of the ATV; (3) restricts lateral and vertical movement of the power transmission shaft at said connection; (4) permits roll rotation of the rear axle about the longitudinal centerline of the power transmission shaft; and (5) restricts lateral movement of the rear axle;

c. a connection between the power transmission shaft and the rear axle which permits transmission of drive torque from the power transmission shaft to the rear axle;

d. one or more springs and shock absorbers interconnected between the rear axle and the chassis in a manner to accommodate pitch and roll rotation of the rear axle; and e. one or more substantially horizontal link arms (1) interconnected between the rear axle and the chassis in a manner to accommodate the pitch and roll rotation of the rear axle and (2) of a size, length, and orientation to transmit drive force from the rear axle to the chassis while minimizing jacking and lowering effect on the chassis in acceleration and deceleration.

8. An all terrain vehicle for operation on varying terrain, including a chassis, an engine attached to the chassis, two front wheels and tires, a front suspension interconnecting the front wheels and tires to the chassis, two rear wheels and tires, a rear axle interconnecting the rear wheels to each other, a rear axle housing surrounding and connected to the rear axle, a vertical longitudinal plane through its center, and a semi-independent rear suspension interconnecting the rear axle and rear axle housing to the chassis, said semi-independent rear suspension including (1) a transverse axis forward of the rear wheels and tires and perpendicular to the vertical longitudinal plane, (2) an effective left link arm on the left rear of the vehicle and outward of the vertical longitudinal plane, pivotally connected to the chassis on the transverse axis, and extending rearwardly and pivotally connected to the rear axle housing, (3) an effective right link arm on the right rear of the vehicle and outward of the vertical longitudinal plane, pivotally connected to the chassis on the transverse axis, and extending rearwardly and pivotally connected to the rear axle housing, (4) a power transmission shaft extending rearwardly from said engine to said rear axle and having a longitudinal axis, and shock absorbers pivotally connected to said chassis and said rear axle housing, wherein the improvement comprises:
a. said left and right effective link arms are pivotally connected to said chassis and said axle housing; and
b. said shock absorbers are pivotally connected to said chassis and said axle housing; to allow said rear axle to rotate about the longitudinal axis of the power transmission shaft, wherein, in travel over relatively even terrain, roll moment loading on the all terrain vehicle will cause a front tire to lose contact with the terrain before any rear tire loses contact with the terrain, thereby maintaining understeer in the all terrain vehicle.

9. The all terrain vehicle of claim 8, wherein
(a) the effective left link arm comprising (1) a first link arm, on the left rear of the vehicle and outward of the vertical longitudinal plane, and (2) a second link arm, on the left rear of the vehicle and inward of said first link arm, and
(b) the effective right link arm comprising (1) a fourth link arm, on the right rear of the vehicle and outward of the vertical longitudinal plane, and (2) a third link arm, on the right rear of the vehicle and inward of said fourth link arm.

10. The all terrain vehicle of claim 8, wherein each of the shock absorbers has a top and a bottom end connection and the top end connection is substantially perpendicular to the bottom end connection.

11. The all terrain vehicle of claim 8, comprising springs interconnected between the chassis and the rear axle.

12. The all terrain vehicle of claim 11, wherein the springs are interconnected with the shock absorbers.

* * * * *